United States Patent
Kemp, II et al.

(10) Patent No.: US 8,666,858 B2
(45) Date of Patent: *Mar. 4, 2014

(54) CLICK BASED TRADING WITH INTUITIVE GRID DISPLAY OF MARKET DEPTH

(75) Inventors: Gary Allan Kemp, II, Winnetka, IL (US); Jens-Uwe Schluetter, Evanston, IL (US); Harris Brumfield, Chicago, IL (US)

(73) Assignee: Trading Technologies International, Inc, Chicago, IL (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/039,093

(22) Filed: Mar. 2, 2011

(65) Prior Publication Data

US 2011/0153486 A1    Jun. 23, 2011

Related U.S. Application Data

(63) Continuation of application No. 11/585,905, filed on Oct. 25, 2006, now Pat. No. 7,904,374, which is a continuation of application No. 11/415,163, filed on May 2, 2006, now Pat. No. 7,813,996, which is a continuation of application No. 10/237,131, filed on Sep. 9, 2002, now abandoned, which is a continuation of application No. 09/590,692, filed on Jun. 9, 2000, now Pat. No. 6,772,132.

(60) Provisional application No. 60/186,322, filed on Mar. 2, 2000.

(51) Int. Cl.
    *G06Q 40/00*    (2012.01)

(52) U.S. Cl.
    USPC .............................................. 705/35; 705/37

(58) Field of Classification Search
    USPC ...................................................... 705/35–45
    See application file for complete search history.

(56) References Cited

U.S. PATENT DOCUMENTS

| 4,674,044 | A | 6/1987 | Kalmus et al. |
| 4,750,135 | A | 6/1988 | Boilen |
| 4,903,201 | A | 2/1990 | Wagner |
| 5,038,284 | A | 8/1991 | Kramer |
| 5,077,665 | A | 12/1991 | Silverman et al. |

(Continued)

FOREIGN PATENT DOCUMENTS

| EP | 0388162 A2 | 9/1990 |
| EP | 1319211 B1 | 4/2005 |

(Continued)

OTHER PUBLICATIONS

Kharouf, J. and Cavaletti, C. "A Trading Room with a View," *Futures*, vol. 27, Nov. 1998, pp. 66-71.

(Continued)

*Primary Examiner* — Richard C Weisberger
(74) *Attorney, Agent, or Firm* — McDonnell Boehnen Hulbert & Berghoff LLP

(57) ABSTRACT

A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently.

32 Claims, 6 Drawing Sheets

(56) References Cited

U.S. PATENT DOCUMENTS

| | | | |
|---|---|---|---|
| 5,101,353 | A | 3/1992 | Lupien et al. |
| 5,136,501 | A | 8/1992 | Silverman et al. |
| 5,243,331 | A | 9/1993 | McCausland et al. |
| 5,270,922 | A | 12/1993 | Higgins |
| 5,297,031 | A | 3/1994 | Gutterman et al. |
| 5,297,032 | A | 3/1994 | Trojan et al. |
| 5,339,392 | A | 8/1994 | Risberg et al. |
| 5,619,631 | A | 4/1997 | Schott |
| 5,689,651 | A | 11/1997 | Lozman |
| 5,689,652 | A | 11/1997 | Lupien et al. |
| 5,774,877 | A | 6/1998 | Patterson, Jr. et al. |
| 5,793,301 | A | 8/1998 | Patterson, Jr. et al. |
| 5,797,002 | A | 8/1998 | Patterson, Jr. et al. |
| 5,809,483 | A | 9/1998 | Broka et al. |
| 5,845,266 | A | 12/1998 | Lupien et al. |
| 5,915,245 | A | 6/1999 | Patterson, Jr. et al. |
| 5,924,082 | A | 7/1999 | Silverman et al. |
| 5,924,083 | A | 7/1999 | Silverman et al. |
| 5,946,667 | A | 8/1999 | Tull, Jr. et al. |
| 5,960,411 | A | 9/1999 | Hartman et al. |
| 5,963,923 | A | 10/1999 | Garber |
| 5,966,139 | A | 10/1999 | Anupam et al. |
| 6,012,046 | A | 1/2000 | Lupien et al. |
| 6,014,643 | A | 1/2000 | Minton |
| 6,035,287 | A | 3/2000 | Stallaert et al. |
| 6,098,051 | A | 8/2000 | Lupien et al. |
| 6,115,698 | A | 9/2000 | Tuck et al. |
| 6,131,087 | A | 10/2000 | Luke et al. |
| 6,134,535 | A | 10/2000 | Belzberg |
| 6,188,403 | B1 | 2/2001 | Sacerdoti et al. |
| 6,195,647 | B1 | 2/2001 | Martyn et al. |
| 6,272,474 | B1 | 8/2001 | Garcia |
| 6,278,982 | B1 | 8/2001 | Korhammer et al. |
| 6,282,521 | B1 | 8/2001 | Howorka |
| 6,317,727 | B1 | 11/2001 | May |
| 6,343,278 | B1 | 1/2002 | Jain |
| 6,408,282 | B1 | 6/2002 | Buist |
| 6,421,653 | B1 | 7/2002 | May et al. |
| 6,766,304 | B2 | 7/2004 | Kemp, II et al. |
| 6,772,132 | B1 | 8/2004 | Kemp, II et al. |
| 6,938,011 | B1 | 8/2005 | Kemp, II et al. |
| 6,993,504 | B1 | 1/2006 | Friesen et al. |
| 7,212,999 | B2 | 5/2007 | Freisen et al. |
| 7,505,932 | B2 | 3/2009 | Kemp, II et al. |
| 7,533,056 | B2 | 5/2009 | Friesen et al. |
| 7,676,411 | B2 | 3/2010 | Kemp, II et al. |
| 7,693,768 | B2 | 4/2010 | Kemp, II et al. |
| 7,720,742 | B1 | 5/2010 | Mauro et al. |
| 7,725,382 | B2 | 5/2010 | Kemp, II et al. |
| 7,813,996 | B2 | 10/2010 | Kemp, II et al. |
| 7,904,374 | B2 | 3/2011 | Kemp, II et al. |
| 2002/0023038 | A1 | 2/2002 | Fritsch et al. |
| 2002/0055899 | A1 | 5/2002 | Williams |
| 2002/0138401 | A1 | 9/2002 | Allen et al. |
| 2003/0097325 | A1 | 5/2003 | Freisen et al. |
| 2005/0149429 | A1 | 7/2005 | Kemp, II et al. |
| 2006/0195388 | A1 | 8/2006 | Kemp, II et al. |
| 2006/0195389 | A1 | 8/2006 | Kemp, II et al. |
| 2007/0038554 | A1 | 2/2007 | Kemp, II et al. |
| 2007/0038555 | A1 | 2/2007 | Kemp, II et al. |
| 2007/0038556 | A1 | 2/2007 | Kemp, II et al. |
| 2007/0038557 | A1 | 2/2007 | Kemp, II et al. |

FOREIGN PATENT DOCUMENTS

| | | |
|---|---|---|
| JP | H10301870 A | 11/1998 |
| WO | 90/11571 A1 | 4/1990 |
| WO | 91/14231 A1 | 9/1991 |
| WO | 93/15467 A1 | 8/1993 |
| WO | 95/26005 A1 | 9/1995 |
| WO | 98/13778 A1 | 4/1998 |
| WO | 98/49639 A1 | 11/1998 |
| WO | 99/13424 A1 | 3/1999 |
| WO | 99/19821 A1 | 4/1999 |
| WO | 99/30259 A1 | 6/1999 |
| WO | 99/53424 A1 | 10/1999 |
| WO | 00/52619 A1 | 9/2000 |
| WO | 00/62187 A2 | 10/2000 |
| WO | 00/65510 A1 | 11/2000 |
| WO | 01/16830 A1 | 3/2001 |
| WO | 01/16852 A2 | 3/2001 |
| WO | 01/22315 A2 | 3/2001 |
| WO | 01/88808 A1 | 11/2001 |
| WO | 00/62187 A3 | 12/2001 |
| WO | 01/22315 A3 | 1/2002 |
| WO | 01/16852 A8 | 6/2002 |

OTHER PUBLICATIONS

USPTO Presentation, NASDAQ, Nov. 8, 2001, 15 pages.
X_Trader Product HTML Page [online], Trading Technologies International, Inc., Jun. 9, 2000. [Retrieved on Mar. 22, 2001] from the Internet: www.tradingtechnologies.com/products/xtrade_full.html.
GL Trade, CAC and Stoxx Futures on MATIF NSC VF, User Information Notes, pp. 1-14, published by GL Trade, London, England, Mar. 15, 1999.
GL Trade, LIFFE Connect for Futures, User Guide, V4.50 Beta, pp. 1-24, published by GL Trade, London, England, Jan. 1999.
GL Trade, LIFFE Connect for Futures, User Guide, V4.50, pp. 1-39, published by GL Trade, London, England, Feb. 1999.
GL Trade, LIFFE Connect for Futures, User Guide, V4.50, pp. 1-39, published by GL Trade, London, England, Mar. 1999.
GL Trade, Liffe Connect for Futures, User Guide, V4.51, pp. 1-57, published by GL Trade, London, England, Jun. 1999.
eSpeed's Supplemental Invalidity Contentions, May 25, 2007.
eSpeed's Disclosure of Invalidity Contentions Pursuant to 35 USC 282, May 25, 2007.
Invalidity Contentions Re: TradePad Module (Letter Dated May 25, 2007).
Supplemental Invalidity Contentions Pursuant to 35 U.S.C. 282, Aug. 10, 2007.
eSpeed's and Ecco's Answers to Plaintiff's Eighth Set of Interrogatories, Aug. 4, 2006.
eSpeed and Ecco's Supplemental Answers to Plaintiff's First, Third, Seventh, Eighth, and Ninth Set of Interrogatories, May 25, 2007.
Defendant GL Trade Americas, Inc's Supplemental Responses and Objections to Interrogatory Nos. 5,17, and 18,Jul. 24, 2006.
eSpeed's Objections and Answers to Plaintiff's Third Set of Interrogatories to Defendant eSpeed, May 12, 2005.
GL WIN Version 4.50, Mar. 3, 1999, DX 538, G 107459-G 107480, DTX 538.
Trading Pad User Manual, Aug. 10, 1999, DX 539, G 112123-G 112131, DTX 539.
Email from Wattier to M. Cartier attaching Matif VF: V4.50 manual, Mar. 30, 1998, DX 592, MC000046-MC000116, DTX 592.
User Guide V4.60 LIFFE Connect for Futures by GL Trade, Jun. 1999, DX 605, G 123548-G 123603, DTX 605.
"A System and Method for Conducting Security Transactions Over a Computer Network", MAURO & BUIST, Mar. 1, 1999, DX 196, eS 066150-eS 066229, DTX 196.
RCG's Presentation re WitCapital, Apr. 22, 2004, DX 208, RCG 000635-RCG 000663, DTX 208.
Mauro, Certified U.S. Appl. No. 09/292,552, Apr. 15, 1999, DX 209, eS 065994-eS 066149.
Various declarations Re: U.S. Appl. No. 09/292,552, Nov. 3, 2003, DX 284, TT 099877-TT 099907, DTX 284.
Evenstreet Presentation prepared for National Discount Brokers, 1999, DX 301, CM 006787-CM 006817, DTX 301.
WIT DSM user interface instructions, Aug. 6, 1998, DX 427, CM 006591-CM 006632, DTX 427.
Presentation re WIT DSM user interface Trade4.ppt, Oct. 12, 1998, DX 430, CM 008265-CM 008330, DTX 430.
WIT DSM Presentation re Information display and decision variables, Dec. 20, 1998, DX 431, CM, 004334-CM 004347, DTX 431.
Evenstreet Presentation prepared for Flatiron Partners, 1999, DX 437, CM 007139-CM 007172, DTX 437.

(56) References Cited

OTHER PUBLICATIONS

WIT Capital digital trading facility presentation to Goldman Sachs, DX 438, CM 004523-CM 004547, DTX 438.
WIT Capital Digital trading facility presentation to PaineWebber, Inc., DX 439, DTX 439.
WIT Capital after hours trading system, MAURO, Mar. 19, 1999, DX 440, CM 009028-CM 009059, DTX 440.
WIT Capital Corporation digital trading facility presentation, Mar. 1999, DX 441, DTX 441.
WIT Capital pdf operator manual for Digital trading facility, 1999, DX 442, CM 00651 O-CM 006513, DTX 442.
Overview re Digital trading facility, DX 443, CM 006315-CM 006344, DTX 443.
Utility Patent Application Transmittal Re: Computer Trading System, Method and Interface, Apr. 15, 1999, Mauro, Kleia, and Buist, PX368.
Photocopy of Disks containing exhibits A and B to declaration of W. Buist, PX366.
SISS Functional specifications version 2.1, Feb. 16, 1988, DX 445, DTX 445.
Overview re SPATS; the Electronic Broker, DX 446, DTX 446.
Status review specialist support system study NYSE, Apr. 10, 1986, DX 447, DTX 447.
Declaration of W. Buist re: WIT DSM System, Apr. 26, 2006, PX 365, DTX 1777.
Sample screens of APT system, DX 150, DTX 150.
Photo of trader w/ APT screen, DX 151, LI FFE 00167-LI FFE 00168, DTX 151.
APT User Guide, Jan. 1994, DX 152, LIFFE 000262-LIFFE 000363, DTX 152.
LIFFE guide/pamphlet, DX 148, DTX 148 (pre-1994).
Release Notes—Market Trader V5.2a, Mar. 18, 1999, DX 617, G 118137-G 118152,DTX617.
Market Trader—Nikkel 225 & Nikkel 300 Index options and Index futures trading users guide, Mar. 20, 1998, DX 618, G1 00444-G1 00462, DTX 618.
Midas Kapiti Delivery Note and Release Note—Market Trader V5.2b, Mar. 31, 1999, DX 619, G 096511-G 096527, DTX 619.
Midas Kapiti Release Notes—Market Trader V5.2e, Apr. 12, 1999, DX 620, G 096694-G 096711, DTX 620.
Midas Kapiti Release Notes—Market Trader V5.2, DX 621, G 096712-G 096727, DTX 621, OS/26/99.
Midas Kapiti Release Notes—Market Trader V5.2e, DX 622, G 096728-G 096754, DTX 622, Jun. 1, 1999.
Midas Kapiti Delivery Note and Release Note—Market Trader V5.2e, DX 623, G 105641-G 105667, DTX 623,May 26, 1999.
Drawing of 1997 TSE terminal by H. Kida, DX 624, DTX 624.
Directory of Software Solutions for LIFFE Connect, Feb. 1999, DX 156, DTX 156.
ScreenShots: Patsystem "Canned" Demo, Feb. 1997, DX 120, PATS 00545-PATS 00559, DTX120.
PTS Client Version 2.1 F, DX 119, PATS 00067-PATS 00082, DTX 119.
PTS trading application Version 1.1 Beta H.1, Mar. 31, 1998, DX 118, PATS 00560-PATS 00600, DTX 118.
Directory of Software Solutions for Liffe Connect, Issue 1, Oct. 1998, DX 155, DTX 155.
Directory of Software Solutions for LIFFE Connect, Issue 3, Jun. 10, 1999, DX 157, DTX 157.
Trading Technologies Trader System User Documentation, Apr. 1, 1998, Release 3.10, DX 3, TT 015867-TT 015955, DTX 3.
Aurora Chicago Board of Trade Brochure, 1990, ES0021230-ES0021241.
Ecco Consulting Study Report MEFF Software Systems, Mar. 17, 1999, ES0060578-ES0060591.
Osaka Stock Exchange Manual (Japanese Document), Apr. 1996 REFCOOO09773-REFCOOO09826.
TSE Manual (Japanese Document), Nov. 15, 2005,DX179,TSE647-995,w/certified translation e562258-62366 [TSE609-647,694-711 ,714-721 ,735-736,749-756,759-760,779-782,784-810,982-995].
TIFFE Manual (Japanese Document), Jan. 1996, REFCOO010861-REFC00011210, (translation included as cite No. C177).
Final Detailed Design Document NYMEX ACCESS, May 5, 1992, eSOO03127-eSOO03541.
The Application Program Interface (API) Reference Manual for LIFFE Connect, Release 3.0, Sep. 1998, DDX 159, DTX 159, eSOO060055-eSOO060145.
The Application Program Interface (API) Reference Manual for LIFFE Connect, Release 3.2, Dec. 1998, DDX 161, DTX 161, eSOO060239-eSOO060331.
The Application Program Interface (API) Reference Manual for LIFFE Connect, Release 3.3, Jan. 1999, DDX 162, DTX 162, eSOO059959-eSOO060054.
The Application Program Interface (API) Reference Manual for LIFFE Connect, Release 2.7,Sep. 1998, DDX 163, DTX 163, eSOO059868-eSOO059958.
OM CLICK Trade User's Guide for Windows NT, Oct. 1998, eSOO064671-eSOO064773.
GLOBEX Members Handbook, Jun. 1992, DX632, DTX632, eS006974-eS0069818.
The Complete GLOBEX2 Handbook, May 1998, DX635, DTX635, CME-E001 0679-001 0891.
The Complete GLOBEX2 Handbook, Jul. 1998, DX637, DTX637, CME-E 014048-CME-E 014286.
Minex Service Outline User Test/Orientation, Sep. 1992, eS0064647-eS0064670.
ORC Instructions for Use Version 2.2.8., 1999, eS0064775-eS0032572.
Interactive Brokers, "Trade Futures Online with Interactive Brokers", May 9, 2005, eS0032571-eS0032572.
Nicholas Economides, "Electronic Call Market Trading", Journal of Portfolio Management, Feb. 1995, eS0069585-eS006961 0.
GL Trading Pad Manual, G0020819-G0020826 (1999).
TradePad Instructions (French), G0025748-G0025749 (date unavailable).
TradePad.vsd Document, Feb. 9, 1999, G011169-G0111670.
Trading pad.doc Document, Jan. 26, 1999, G0111671-G0111672.
GL WIN et Logiciels complementaires (French), Oct. 1999, G009121-G009486.
GL WIN et Logiciels complementaires (French), Jul. 1999, G009875-G010238.
Memo re: Dual AACCESS Version 4.5 release, Mar. 21, 1999, G0022956-G0022959.
tradepad.txt (French), Mar. 8, 2000, G0025616-G0025618.
GL Enhancements Software Version 4.11 f, Oct. 29, 1998, G0060853-G0060854.
GL Enhancements Update, Jan. 27, 1999, GO1 01682-G01 01688.
LIFFE Connect Futures Release Note 050399.doc, Mar. 3, 1998, G0111402-G0111407.
TradingPad.doc, Apr. 30, 1999, G0112117-G0112122.
TradingPadUserManual.doc, Aug. 10, 1999, G0112123-G0112131.
GL WIN Version 4.51, G0118856-G0118865.
GL Trade Presentation (French), Apr. 25, 1999, G0118989-G0119044.
LIFFE Connect Futures Functional Technical Issues to Resolve, Apr. 12, 2007, G0119049-G0119050.
LIFFE Connect for Equity Options User Guide v4.30, Nov. 1998, G0119052-G0119086.
Member Participation in the Futures Market, Apr. 12, 1999, G0119196-G0119197.
Email from Patricia Gauthier to Sam Page, Jan. 25, 1999, G0119377-G0119380.
LIFFE Connect ISV Circular No. 001.99, Jan. 8, 1999, G0119566-G0119568.
LIFFE Connect ISV Circular No. 14.99,Mar. 2, 1999, G0119583-G0119590.
LIFFE Connect ISV Circular No. 004.99,Jan. 15, 1999, G119615-G0119616.
LIFFE Connect ISV Circular No. 001.99, Jan. 15, 1999, G0119617-G0119618.
LIFFE Connect ISV Circular No. 008.98, Dec. 28, 1998, G0119631-G0119632.
Screenshot of GL TradePad, G0119660.

(56) References Cited

OTHER PUBLICATIONS

LIFFE Connect for Futures Schedule for Project Deliverables, Feb. 4, 1999, G0119681-G0119682.
LIFFE Connect for Futures-Project Update #1, Meeting of Jan. 11, 1999, G0119691-G0119697.
LIFFE Connect for Futures: Project Update 2, Meeting of Feb. 10, 1999, G0119698-G0119704.
LIFFE Connect for Futures: Project Summary: Apr. 19, 1999, G0119705-G0119717.
Functional Enhancements for LIFEE Connect for Futures Project, Apr. 12, 1999, G0119718-G0119724.
Functional Enhancements for LIFEE Connect for Futures Project, Apr. 12, 1999, G0119725-G0119745.
Functional Enhancements for LIFEE Connect for Futures Project, Mar. 3, 1999.
Installation, Market Entry Test, and Technical Dress Rehearsal Summary, Feb. 23, 1999.
GL Trade Checklist-Installation Requirements for Futures, Jan. 1999, G0119795-G0119798.
Cahier de charges.doc, Feb. 9, 1999, G0111752-G0111758.
Keyboard example, Feb. 3, 2006, G007308-G007310.
GL Brochure, G0021652-21658.
GL Cost and Services, 1998, GO1 08876.
GL Win Summary (French), Jun. 1998, G0091 004-G0091 046.
Swiss Exchange SWX—TS User Manual, Dec. 31, 1998, DTX 2215, eS0032293-eS0032547.
Screen No. 100-Order Book & Order Entry 1 (Single View), eS060637-eS060639.
GLOBEX User Guide, Jan. 1997, DDX 633, DTX 633, eS069819-eS070081.
QuickTrade Document and Brochure, G021027-21031.
LIFFE Connect for Futures User Guide v4.5, Jun. 1999, G0025751-25806.
GL Version 4.70 (French Version), Jan. 5, 2000, G0026505-26533.
GL Version 4.70 (English Version), Jan. 5, 2000, G0020593-20621.
GL WIN and Related Software Manual, Sep. 11, 2000, 1) G0025251-25615.
GL WIN and Related Software Manual, 2) G0025942-26267.
GL WIN and Related Software Manual, 3) GO1 0239-1 061 0.
GL WIN et Logiciels complementaires (French), G0009495-9874.
Internal Product News doc on QuickTrade, G0020468-20471.
"Introducing the Company: GL Trade" product offerings and slide presentation (to Reuters), G0026534-26559.
GL Product Leaflet Re: Mosaic, G0022529-22530.
Thomson Financial leaflet, Sep. 2003, G0022445-22450.
LIFFE Connect for Futures leaflet, G0023885-23888 (Jan. 1999).
TSE Japanese Document, pp. 4-15.
TSE Japanese Document, pp. 6-15.
Megumi Miyoshi, Japanese Patent Application No. 2001-564025, Apr. 18, 200.
"Amazon.com Catapults Electronic Commerce to Next Level with Powerful New Features," Amazon.com Press Release, Sep. 23, 1997, DTX1034, DezmelykOOO012-13.
Apple Advertisement, Scientific American, Sep. 1984, Scientific American Inc. NY, NY DezmelykOOO014-33.
Memo Re: Downloading the Terminal Program, Aug. 18, 2005.
"Specialist vs. Saitori: Market-Making in New York and Tokyo", Richard Lindsay and Ulrike Schaede, DTX 1170, Jul.-Aug. 1992, SilvermanOO0494-SilvermanOO0506.
"Building for Excellence", MINEX Brochure, DTX 1153, SilvermanOO0330-SilvermanOO0334.
Chicago Mercantile Exchange (CME) Brochure, DTX1163, SilvermanOO0406-SilvermanOO0407.
MEFF Renta Fija Manual, DTX 1165, Oct. 1997, SilvermanOO0410-SilvermanOO0473.
O'Hara and Oldfield, "The Microeconomics of Market Making", Journal of Financial and Quantitative Analysis, Dec. 1986, DTX 1169 Silverman000478-SilvermanOO0493.

Terminal Use Manual—Windows NT Version, Tokyo International Financial Futures Exchange (TIFFE), 1994, Silverman002552-Silverman002616, DTX 1226.
USPTO Press Release, "Electronic Patent Application Records Replace Paper Files at USPTO", DTX 2285,Sep. 19, 2007.
Memorandum Opinion and Order Re: '132 and '304 Claim Construction [425], Oct. 31, 2006.
Memorandum Opinion and Order Re: TT's Motion for Clarification [475], Feb. 21, 2007.
Memorandum Opinion and Order Re: Non-Infringement [708], Jun. 20, 2007.
Memorandum Opinion and Order Re: Motions for Reconsideration [875], Aug. 27, 2007.
Memorandum Opinion and Order Re: "Single Action" Ruling [963], Sep. 12, 2007.
Memorandum Opinion and Order Re: Preliminary Injunction [83], Feb. 9, 2005.
Memorandum Opinion and Order Re: eSpeed's Motion for Summary Judgment of Invalidity Denied [845], Aug. 21, 2007.
Memorandum Opinion and Order Re: TT's Motion to Preclude Prior Sale Defense Denied [873], Aug. 27, 2007.
Memorandum Opinion and Order Re: GL's Motion for Reconsideration Denied [994], Sep. 19, 2007.
Memorandum Opinion and Order Re: Priority Date [769], Jul. 12, 2007.
Memorandum Opinion and Order Re: Priority Date [1013], Sep. 25, 2007.
Memorandum Opinion and Order Re: Prior Public Use [835], Aug. 16, 2007.
Memorandum Opinion and Order Re: Defendant's Motion for Judgment as a Matter of Law on Indefiniteness [1141], Jan. 2, 2008.
Notification of Docket Entry Re: Defendants eSpeed's Motion for Judgment as a Matter of Law on Invalidity is denied [1140], Jan. 3, 2008.
Notification of Docket Entry Re: Defendant eSpeed's Motion for a New Trial is denied [1142], Jan. 3, 2008.
Memorandum Opinion and Order Re: Defendant's Motion for Judgment as a Matter of Law on Willfulness [1144], Jan. 3, 2008.
Deposition testimony of Hiroyuki Kida dated May 17, 2007 and May 18, 2007 with DDX 617-624, POX 519-524 and POX 531.
Trial testimony of Hiroyuki Kida dated Sep. 28, 2007 and Oct. 1, 2007 with DTX 617.
Deposition testimony of Atsushi Kawashima dated Nov. 21, 2005 with DDX 178-185.
Trial testimony of Atsushi Kawashima dated Sep. 26, 2007 with DTX 183.
Deposition testimony of Philip Carre dated Jun. 22, 2007, Sep. 6, 2007 & Sep. 13, 2007 with DDX 384-385; 473;494; 527;537-541; 592; 593A; 595-598; 605; 626; 629; 719-723; 728-732; 897-898; 896.
Deposition testimony of Michael Cartier dated May 9, 2007 with DDX 587-588; DDX 592-593A and POX 498-500.
Deposition testimony of Cristina Dobson dated May 18, 2007 with DDX 625-635; DDX 637; POX 533 and POX 535.
Deposition testimony of Nicholas Garrow dated Jun. 14, 2007 with DDX 116 and DDX 592.
Trial testimony of Nicholas Garrow (via expert witness) dated Oct. 2, 2007.
Deposition testimony of Michael Glista dated Feb. 20, 2007 with DDX 382-386.
Trial testimony of Michael Glista dated Sep. 24, 2007 and Sep. 25, 2007 with DTX 382-386; DTX 524; DTX 570; DTX 579; DTX 592; DTX 3020; DTX 3050; DTX 3057; DTX 3110; PTX 1993; PTX 2065; PTX 2092; PTX 2094.
Deposition testimony of Laurent Havard dated Apr. 24-26, 2007, May 12, 2007, Jun. 21, 2007 and Sep. 5, 2007 with DDX 506; DDX 508; DDX 517; DDX 539; DDX 551-568; DDX 570-573; DDX 575; DDX 603; PDX 462; PDX 464-483; PDX 767-769; PDX 771-774; PDX 875-877; PDX 882-888 and PDX 893.
Trial Testimony of Laurent Havard dated Sep. 21, 2007 with DTX 384; DTX 520; DTX 561-62; DTX 570; DTX 573; DTX 575; DTX 593; DTX 750-52; DTX 3011; DTX 3017-18; DTX 3050; PTX 575; PTX 2064; PTX 2074; PTX 2077; PTX 2079.

(56) References Cited

OTHER PUBLICATIONS

Deposition testimony of Jean Cedric Joliant dated Apr. 26, 2007 and Jun. 13, 2007 with DDX 384; DDX 517; DDX 520; DDX 551-568; DDX 575-577; PDX 465-483.
Trial testimony of Jean Cedric Jollant dated Sep. 20, 2007 with DTX 157; DTX 473; DTX 719; DTX551-64; DTX598; DTX722; DTX 1903; DTX3009-10; DTX3014; DTX3016-18; DTX 3020; DTX 3023; DTX 3025; PTX 166; PTX 520; PTX 526; PTX 539; PTX 573; PTX 575; PTX 579; PTX 2065.
Deposition testimony of Marc Lorin dated Sep. 5, 2007 with DDX 385; DDX 721-722; DDX 730.
Deposition testimony of Christopher Malo dated May 23, 2007 with DDX 524.
Deposition testimony of Fred Mastro dated May 21, 2007 with DDX 638; PDX 538; PDX 540-543.
Trial testimony of Fred Mastro dated Sep. 25, 2007 with DTX 592.
Deposition testimony of William McHorris dated Apr. 10, 2007 with PDX 416-417.
Deposition testimony of Josephine Sheng dated Jun. 26, 2007 with DDX 520; DDX 522; DDX 536; DDX 575; POX 493; PDX 683-683a; PDX 775.
Deposition testimony of Bruno Spada dated Apr. 30, 2007 and May 2, 2007 with DDX 384-385; DDX 519-21; DDX 537-38; DDX 579-580; DDX 522; DDX 538; PDX 493-495; PDX 519-522.
Trial testimony of Bruno Spada dated Sep. 24, 2007 with DTX 306; DTX 384; DTX 518-522; DTX 524; DTX 575; DTX 579-580; DTX 593; DTX 626; DTX 628; DTX 646; DTX 1899 DTX 2086; DTX 3020-3021; DTX 3058-3059; DTX 3061; DTX 3085; PTX 737; PTX 840; PTX 2083; PTX 2087; PTX 2099; PTX 2101.
Deposition testimony of Marcel Tchitchiama dated May 10-11, 2007 with DDX 156-157; DDX 168; DDX 384-85; DDX 538; DDX 592-93A; DDX 595-98; DDX 602-06; DDX 608-11 DTX 494; PDX 503; PDX 506; PDX 612.
Deposition testimony of Neil Treloar dated Jun. 19, 2007 with DDX 384; DDX 539-39A; DDX 724; DDX 726; POX 492; POX 750-752.
Trial testimony of Neil Treloar dated Sep. 21, 2007 and Sep. 24, 2007 with DTX 2040-2042.
Trial testimony of Gerard Varjacques dated Sep. 28, 2007 with PTX 509-510 and PTX 513.
Deposition testimony of Amy Watson dated Jun. 12, 2007 with DDX 626A; DDX 700 and POX 636.
Deposition testimony of Barbara Wattiez dated Jun. 16, 2007 with DDX 719-723.
Trial testimony of Barbara Wattiez dated Sep. 28, 2007 with DTX 592-593A; DTX 597-598; DTX 718-719; DTX 722.
Deposition testimony of Christopher Buist dated Jun. 22, 2006 with POX 358-364 and DDX 283-284.
Deposition testimony of Walter Buist dated Jun. 23, 2006 with DDX 315; PDX 310- 315; PDX 365 and PDX 368-370.
Digital trading facility weekly operations meeting outline, DX 444, DTX 444, CM 006661-CM 006661,May 10, 1999.
Chart re DSM QA Test Plain—project plan in progress, DX 432, DTX 432, Nov. 4, 1998.
User interface design specification for WIT capital digital stock market, DX 433, DTX 433 CM 008441-CM 008478, Jan. 18, 1999.
Updated negotiations design to E. Lang from C. Mauro for review and approval prior to patent application, DX 434, CM 008410-CM 008414, DTX 434,Jan. 18, 1999.
Notes re final additions/revisions, DX 435, CM 007949-CM 007955, DTX 435, Apr. 2, 1999.
Position paper: On-line training and customer acquisition; WIT Capital DSM product launch and related schedule to E. Lang, DX 436, DTX 436, CM 006580-CM 006590, Feb. 22, 1999.
Meeting outline, DX 428, CM 00750-CM 007501, DTX 428,Sep. 11, 1998.
Presentation re WIT Capital Digital stock market Phase 1 usability and customer response testing: Preliminary report of findings, DX 429, CM 007446-CM 007466, May 1, 2006.
WIT Capital limit order book to L. Forrest from C. Mauro, DX 425, CM 007382-CM 007411, DTX 425,Apr. 20, 1998.
User Interface Design for display options design, DX 426, CM 000249-CM 000287, DTX 426,Jul. 8, 1998.
Letter from EPO to TT Re: Five Recently Filed European Patent Oppositions, Feb. 21, 2006.
Notice of Opposition to a European Patent EP 1319211 B 1, AN ITRA Medienprojekte GmbH, Jan. 13, 2006.
Notice of Opposition to a European Patent by Deutsche Borse AG Jan. 12, 2006.
Notice of Opposition to a European Patent by EccoWare Ltd., Jan. 13, 2006.
Notice of Opposition to a European Patent by Rosenthal Collins Group LLC, Jan. 12, 2006.
Notice of Opposition to a European Patent by Tick-It GmBh, Jan. 13, 2006.
Declaration of Walter Buist, Exhibit 17, Apr. 26, 2007; with Faxed Signature Page.
Letter from J. Walaski to the EPO Re: Change of Address, Dec. 19, 2006.
A. Klein, WallStreet.com—Fat Cat Investing at the Click of a Mouse, Chapt. 14 "Finding Gold in Tribeca", 1998; Exhibit 16.
A. Klein, WaliStreet.com—Fat Cat Investing at the Click of a Mouse, Chapt. 14-16, 18, 23, 1998; Exhibit 16 (Cont'd).
WIT Digital Stock Market, User Interface Rev. 9, Exhibit 15 (circa 1999).
Opposition Trading Technologies, Inc. Application No. 01920183.9 EP 1319211 B1, Exhibit 4 (Japanese and English Versions), Sep. 1997.
System for Buying and Selling Futures and Options Transaction Terminal Operational Guidelines, TSE Business Systems Dept., TSE647-995, eS062297-eS062380, D1(2) (Aug. 1998).
Letter from EPO to TT Re: Further European Patent Opposition, Feb. 23, 2006.
Letter from EPO to TT Enclosing European Patent Oppositions, Jan. 25, 2006.
Opposition TT, EP 1 319211 B1, Copy set 1, Annex One—Grounds of Opposition, Jan. 19, 2006.
Deposition Transcript of Atsushi Kawashima, Nov. 21, 2005, Opposition EP 1 319 211 B1 Exhibit 3.
The Application Program Interface (API) Reference Manual for LIFFE Connect, Sep. 1998, release 3.1, EP 1 319211 B1 Exhibit 7A, e80060146-e80060237.
Deposition Transcript of Paul MacGregor, Nov. 1, 2005, Opposition EP 1 319 211 B1 Exhibit 9A.
APT Trading Procedures (ATOM Version) of LI FFE, Apr. 3, 2001, Opposition EP 1 319211 B1 Exhibit 9B.
APTplus Trading Procedures, Dec. 28, 1995, Opposition EP 1 319211 B1 Exhibit 90.
IRIS Investment Support Systems Window Ad, Opposition EP 1 319211 B1 Exhibit 10.
Fig.2 Substitute Sheet (Rule 26), Opposition EP 1 319 211 B1 Exhibit 13A.
Provisional U.S. Appl. No. 60/186,322, Opposition EP 1 319211 B1 Exhibit 13B.
LIFFE's New Electronic Trading Platform for Futures, LIFFE 202-261, Opposition EP 1319211 B1 Exhibit 8D.
TIFFE Internet Article, "New On-Screen Trading Terminals", E2 (circa 1998).
System for Buying and Selling Futures and Options Transaction Terminal Operational Guidelines, TSE Business Systems Dept., TSE00647-81 0, eS0622977-eS062366, D1 (2).
ORC Instructions for Use, Version 2.2.8., 1999.
Futures/Options Trading System Guidelines for Operating the Trading Terminals, TSE Business Systems Dept., TSE00628-643, eS062278-eS062293, 01 (3).
Securities Industries News, "TT Upgrades Software Platform", Aug. 28, 2000 (D6).
Letter to EPO from Karl Barnfather Enclosing Notice of Opposition (form 2300.1) and Grounds of Opposition (Annex 1),Jan. 12, 2006.
Dow Jones & Reuters Factiva, "Firms Rush to Make LI FFE Connect Decision", Dec. 4, 1998, E6.
Dow Jones & Reuters Factiva, "Date Broadcasting Partners with Alltech Investment to Provide Customers with Online Trading", Feb. 25, 1999, E8.

(56) References Cited

OTHER PUBLICATIONS

Trading Pad Document (E3).
Japanese Document, TSE00609-627, Dec. 1, 2006 (E5), with Translation.
TT X-Trader Brochure, Dec. 1, 2006 (E7).
Letter to J. Walanski from EPO Re: Payment, Apr. 20, 2005.
Letter to J. Walanski from EPO Re: Decision to Grant TT Patent, Mar. 3, 2005.
German Document from Tick-IT GmbH Filing New European Opposition, Jan. 14, 2006.
Faxed German Document from Tick-IT GmbH Filing New European Opposition, Jan. 13, 2006.
Annex A to TT's Reply Brief.
Annex B to TT's Reply Brief.
Memo Re: Futures/Options Trading System and Japanese Patent Application No. 2001-564025 (Japanese), Aug. 18, 2005.
Patsystems News Rel. Nov. 6, 2000.
Court's ruling on no prior sale.
Memorandum Opinion and Order Re: No prior use.
Memorandum Opinion and Order Re: Inequitable Conduct.
Memorandum Opinion and Order Re: Court Reaffirming Priority.
Tokyo Stock Exchange, Publication 1, "Next-Generation Futures Options Trading System" (participants seminar materials), Sep. 1997 with English Translation.
REFCO English Translation of Tokyo Stock Exchange, Publication 1, "Next-Generation Futures Options Trading System" (participants seminar materials), Sep. 1997.
Tokyo Stock Exchange, Publication 2, "Futures/Options Trading System Guidelines for Operating the Trading Terminals", Aug. 1998 with English Translation.
REFCO English Translation of Tokyo Stock Exchange, Publication 2, "Futures/Options Trading System Guidelines for Operating the Trading Terminals" (participants seminar materials), Aug. 1998.
Tokyo Stock Exchange, Document 1, "Downloading the Terminal Program and Sending the Replacement for the Guidelines for Operating the Trading Terminals", Jan. 2000 with English Translation.
Tokyo Stock Exchange, Publication 3, "Tokyo Stock Exchange 50th Anniversary Book of Materials", Jul. 31, 2000 with English Translation.
REFCO English Translation Tokyo Stock Exchange, Publication 3, "Tokyo Stock Exchange 50$^{th}$ Anniversary Book of Materials", Jul. 31, 2000.
English Translation of Tokyo Stock Exchange Offer Form, Apr. 18, 2005.
Information Offer Form, Apr. 18, 2005.
Notification of Information Offer Form, Jun. 3, 2005.
"APT: A trading system for the future," The London International Financial Futures Exchange (UFFE), 1990, 11 pages.
Trading Screen, INTEX of Bermuda, 1984, one page.
Weber, B.W., "Information Technology in the Major International Financial Markets," Stern School of Business, New York University, Apr. 7, 1993, pp. 1-43.
Trading Screen, TIFFE Exchange, circa 1989-1990, one page.
Trading Screen, MEFF Exchange, 1990, one page.
Cavaletti, C., "Order Routing,", Futures Magazine, Feb. 1997, pp. 68-70.
"Aurora: The most technologically advanced trading system available today," Chicago Board of Trade, 1989, 11 pages.
"One Click Trading Options," Trading Technologies, Inc., 1998, one page.
Trading Screen, SWX Exchange, 1990, two pages.
"Expanding futures and options trading around the world, around the clock," GLOBEX, 1989, 48 pages.
S. Hansell, "The computer that ate Chicago," Institutional Investor, Feb. 1989, 5 pages.
"Sydney Futures Exchange Announces Plans to Join GLOBEX," GLOBEX Report: An Update on the CME global electronic exchange, vol. II, No. 2, Feb. 10, 1989, 4 pages.
New York Mercantile Exchange (NYMEX) Access Documents, Feb. 28, 1992, 413 pages.

The Computer Assisted Trading System (CATS) Traders' Manual, Toronto Stock Exchange, Sep. 30, 1977, 142 pages.
Market Watch trading screen, date not available, 1 page.
Grummer et al., "Preliminary Feasibility Study," Bermudex Ltd., Nov. 1980,100 pages.
Peake et al., Appendix C of Preliminary Feasibility Study, "The ABCs of trading on a national market system," Bermudex Ltd., Sep. 1997,16 pages.
Peake, J.W., Appendix E of Preliminary Feasibility Study, "The last fifteen meters," Bermudex Ltd., Jun. 15, 1997,18 pages.
Declaration of Brendan Bradley in Case No. 04 C 5312, Nov. 18, 2004, 27 pages.
Memorandum Opinion and Order of Judge James B. Moran in Case No. 04 C 5312, Feb. 9, 2005, 22 pages.
EPO Comments to Opposition to European Patent EP 1319211 dated Dec. 1, 2010 (67 pages).
Memorandum Opinion and Order issued by Judge Virginia M. Kendall in *Trading Technologies International, Inc.* v. *BCG Partners, Inc.*, Case 1:10-cv-00715, dated Feb. 9, 2012.
Decision on Appeal issued by United States Court of Appeals for the Federal Circuit in *Trading Technologies International, Inc.* v. *Open E Cry, LLC*, Case 2012-1583, dated Aug. 30, 2013.
Allen, A., and Zarembo, L., "The Display Book: The NYSE Specialists' Electronic Workstation" in The Challenge of Information Technology for the Securities Markets: Liquidity, Volatility, and Global Trading, Eds. Henry C. Lucas Jr. and Robert A. Schwartz, p. 205-213, alleged available as of 1989, G0176623G0176633.
Australian Patent Office Search and Examination Report for Singapore Patent Application No. 200405020-9 dated Aug. 2, 2007, mailed Aug. 7, 2007.
Automated Trader Journal, Q4 2007, alleged available as of Oct. 1, 2007, DDX_Buhannic 010.
BNA, Inc. Securities Regulation & Law Report, "Possibility of 'After Hours' Trading Raises Liquidity, Other Concerns for SEC" vol. 31, No. 16, Apr. 23, 1999, ISSN 1522-8797 [Retrieved from the Internet at http://pubs.bna.com on Apr. 19, 2007], DDX 550.
Broker Workstation handwritten notes, alleged available as of Mar. 1, 1991, G0173819-0173920.
Buist invoice to eSpeed, alleged available as of Feb. 8, 2006, PDX 955.
CBOT Broker Workstation Functional Specification, alleged available as of Mar. 6, 1991, G0173785-0173818.
Chicago Mercantile Exchange, CUBS (CME Universal Broker Station) Brochure, alleged available as of Feb. 1, 1997, CME-E0000699-0000700.
Clemons, E., and Weber, B., "Alternative Securities Trading Systems: Tests and Regulatory Implications of the Adoption of Technology," Information Systems Research, vol. 7, No. 2, alleged available as of Jun. 1996, G0031593-0031618.
CME Group, CME Globex Access Directory, alleged available as of Jan. 1, 2008, G0137650-0137727, DDX_Buhannic 011.
Comparison of BTQPane.java files, alleged available as of Jun. 18, 1998, PDX 957.
CQG, LLC's and CQG, Inc.'s Initial Invalidity and Unenforceability Contentions, Civil Action No. 05-cv-4811, dated Jul. 23, 2012.
CQG's Final Invalidity Contentions, Case No. 05-cv-4811, dated May 10, 2013.
Credit Suisse First Boston, PrimeTrade promotional materials and press releases, alleged available as of Jan. 19, 1999, CSFB000036-000046, PDX_Buhannic 001.
Declaration of Brian Schneider, Apr. 4, 2011, G0186079-0186081.
Declaration of Gregory Veselica, Mar. 30, 2011, G0186082-0186084.
Declaration of Thomas Cooper, Mar. 22, 2011, G0186076-0186078.
Deposition testimony of Bautz, William dated Apr. 20, 2007 with DDX 550.
Deposition testimony of Buhannic, Philippe dated Dec. 6, 2011 with DDX_Buhannic 001, 003, 004a, 006, 009, 010, 011, 013, 014, 015; PDX_Buhannic 001-002.
Deposition testimony of Buist, Walter dated Jun. 11, 2009 with PDX 950-955, 957-958; PDX 365.
Deposition testimony of Feltes, David dated Jan. 24, 2007 with PDX_Feltes 002.

(56) References Cited

OTHER PUBLICATIONS

Deposition testimony of Greenstein, Mark dated Feb. 24, 2011 with DDX_Greenstein 003, 008.
Deposition testimony of Havard, Laurent dated Nov. 14, 2012; Errata dated Dec. 7, 2012.
Deposition testimony of McCausland, Robert dated Apr. 7, 2005 with DDX 111-114.
Deposition testimony of Peake, Junius dated Jun. 3, 2005 with DDX 121; Errata dated Jul. 26, 2005.
Deposition testimony of Spada, Bruno dated Dec. 19, 2012.
Deposition testimony of Steiner, Erik dated Mar. 8, 2011 with DDX_Steiner 001, 003-005; Errata dated May 5, 2011.
Deposition testimony of Stengard, Mats dated Oct. 25, 2011 with DDX_Stengard001-003; Errata dated Nov. 25, 2011.
Deposition testimony of Villain, Michael dated Oct. 11, 2011 with DDX_Villain001, 002, 006, 011, 012.
Deposition testimony of Wille, Mark dated Jun. 29, 2011 with DDX_Wille 002, 010, 011.
Deposition testimony of Yavorsky, Tina dated Apr. 13, 2007 with DDX 474.
Deutsche Borse Group, DTB Member Manual Trading, Description of the Screens, Eurex 1.0/DTB 5.0 Version 01 May 11, 1998, E0000144-0000305.
dsmChanges.txt, alleged available as of Feb. 3, 2006, PDX 958.
Edo User Guide Release 1.10.1, The Global Order Routing and Order Execution System, alleged available as of May 7, 1997, G0049458-0049531, DDX_Buhannic 015.
Email from J. Damgard to FIA Board of Directors re FIA Subcommittee on Intellectual Property, alleged available as of Nov. 3, 2004, FIA0008, PDX_Buhannic 002.
English Translation of Tokyo Stock Exchange, Orientation Materials for Participants, New Future Options Trading System, Produced on Oct. 29, 2010 by Defendant Rosenthal Collins Group, LLC (RCG) in civil proceeding 1:10-cv-00929 *Trading Technologies International, Inc.* v. *RCG*, -alleged available as of Sep. 1997, RCG-TT0146811-0146830.
English Translation of Tokyo Stock Exchange, Orientation Materials for Participants, New Future Options Trading System, Produced on Feb. 5, 2007 by Defendant GL Consultants, Inc (Gl) in civil proceeding 1:05-cv-04120 *Trading Technologies International, Inc.* v. *GL et al*, alleged available as of Sep. 1997, G0100319-0100355.
eSpeed's Answers to TT's Eighth Set of Interrogatories, Interrogatory No. 22, Case No. 04 C 5312, dated Aug. 4, 2006.
Euro Servisen customers screen layout, hand drawn, alleged available as of Apr. 20, 2011, DDX_Gemon 001.
European Search Report for EP Application No. 04105905.6 dated Mar. 24, 2005, mailed Apr. 1, 2005.
Front Capital Systems AB, OPTRADE User Manual, Version 1.70, alleged available as of Jan. 1, 1991, G0175926-G0175955.
GATElab, webpage of product offerings, alleged available as of Jan. 1, 2011, DDX_Villain 012.
Geotext English Translation of Tokyo Stock Exchange, Futures/Options Trading System, Guidelines for Operating the Trading Terminals, alleged available as of Aug. 1, 1998, RCG-TT 0146831-RCG-TT 0146846.
GL and SunGard's Supplemental Objections and Responses to TT's Interrogatories, Case No. 05-cv-4120, dated Mar. 8, 2013, Redacted, Non-confidential portions only.
GL Trade User Guide for Globex2, alleged available as of Apr. 1, 1999, CME-E0014287-0014489.
GL Trade, GL Win Version 4.50 Note d'information, alleged available as of Mar. 3, 1999, G0108715-0108751, DDX_Villain 006.
GL Trade, GLNEGO Version 4, alleged available as of Feb. 1, 1999, 60123387-0123447.
GL Trade, Matif VF: V4.50, alleged available as of Mar. 30, 1999, G0123140-G0123209.
GL Trade, User Guide V4.50, LIFFE Connect for Futures by GL Trade, alleged available as of Mar. 1999, G-RP0123448.
GL Trade, Note d'information d'utilisation de GLWIN pour le passage des futurs CAC et STOXX sur NSC VF (French-language document); Informational notice of use on GLWIN (with Trade Pad) re Stockwatch and GLNego equivalents, alleged available as of Mar. 9, 1999, G0111620-G0111634.
Great Britain Search Report on GB Application No. 02193068.8 dated Nov. 27, 2002.
Handwritten diagram re INTEX screen, alleged available as of Apr. 7, 2005, DDX 112.
Handwritten document entitled pre '92 and post '92 with figures, alleged available as of Mar. 8, 2011, DDX_Steiner 003.
Handwritten document with drawing and figures, alleged available as of Mar. 8, 2011, DDX_Steiner 001.
Handwritten document with x's and lines, alleged available as of Feb. 24, 2011, DDX Greenstein 003.
Handwritten document with XYZ and numbers, alleged available as of Mar. 8, 2011, DDX_Steiner 004.
International Preliminary Examination Report on PCT Application No. PCT/USO1/06792 dated Apr. 9, 2002, mailed Apr. 12, 2002.
Intex Project Specifications, alleged available as of Jul. 22, 1985, eS0024917-0024950, DDX 114.
INTEX, Functional Specifications, alleged available as of Aug. 1981, eS0003547-0003616, DDX 113.
Kollock, P. "Market Morphing" Futures Industry Magazine, vol. 7, No. 7, p. 15-17, alleged available as of Oct. 11, 1997, G0116279-0116361, DDX_Villain 002.
Letter from W. Buist to G. Fishman re tasks performed for TT project, alleged available as of Jun. 12, 2006, PDX 954.
LIFFE, The Application Program Interface (API) Reference Manual for LIFFE Connect, Release 3.1, alleged available as of Sep. 1998, G0023004-0023068.
Marion, L. "The paperless exchange" Institutional Investor, vol. 20, No. 4, black and white, alleged available as of Apr. 1986, DDX_Steiner 005.
Marion, L. "The paperless exchange" Institutional Investor, vol. 20, No. 4, color, alleged available as of Apr. 1986, G0157750-0157755, DDX_Wille 002.
Memo to Distribution from R. McCausland re: Open Spread Development; Memo to E. Brian from McCausland re: The Full INTEX Network & Trading System Components, M1-M17, alleged available as of May 29, 1984, DDX 111.
Memorandum Opinion and Order issued by Judge James B. Moran in Case 1:05-cv-04088, *Rosenthal Collins Group, LLC*, vs. *Trading Technologies International, Inc.*, May 16, 2007, PDX 950.
Midas-Kapiti International, Market Trader, Nikkei 225 & Nikkei 300 Index Options and Index Future Trading Users Guide, v1.3, alleged available as of Dec. 18, 1997, G0100463-0100481.
Midas-Kapiti International, Release Notes, Market Trader v.5.2e, alleged available as of May 24, 1999, G0105642-G0105667.
Munshi, Jamal Huq. "The Impact of Information Technology on Securities Markets: Evidence from the New York Stock Exchange," PhD dissertation, University of Arkansas. Ann Arbor: ProQuest/UMI, Order No. 9237410, alleged available as of Jan. 1, 1991, G0147878-G0148049.
New York Stock Exchange, Display Book User Reference, alleged available as of Jan. 1, 1992, G0146068-G0146243.
New York Stock Exchange, Floor Operations Display Book Guide, Version 3.1, alleged available as of May 1998, G0145920-G0146065, DDX_Wille 011.
New York Stock Exchange, Portions of 1984 and 1985 Annual Reports, alleged available as of 1984, G0146656-G0146659.
New York Stock Exchange, Release 2.1 Display Book, alleged available as of Nov. 1, 1996, G0146649-0146650. DDX_Wille 010.
OM Click Trade User's Guide for Windows NT, including Addendum for HKFE, alleged available as of Oct. 1998, G0046709-0046816, DDX_Stengard 003.
OM, The OM Click Trade User Guide for Windows NT, alleged available as of Nov. 1997, G0202935-0203019, DDX_Stengard 002.
Open E Cry, LLC's Initial Invalidity Contentions, Case No. 1:10-cv-00885, dated Oct. 19, 2010.
Osaka Securities Exchange (Japanese-language document), alleged available as of Jan. 1, 1997, G0046918-0046937.
P.O.S. Display Book, Release 2.0: Screen Components Navigation & Layout, User Requirements Specification, alleged available as of Mar. 28, 1995, 601534050153428, DDX_Greenstein 008.

(56) References Cited

OTHER PUBLICATIONS

Philpot, J., and Peterson, C., "Improving the Investments or Capital Markets Course with Stock Market Specialist," Financial Practice and Education, Fall/Winter 1998, alleged available as of 1998, G0075378-0075384.
Piantoni, R., and Stancescu, C. "Implementing the Swiss Exchange Trading System," Proceedings of the 27th International Symposium on Fault-Tolerant Computing (FTCS), alleged available as of 1997, G0077767-G0077771.
PrimeTrade's application window, alleged available as of Jun. 22, 1998, DDX_Buhannic 004a.
PrimeTrade's application window, alleged available as of Jun. 22, 1998, G0080109-0080110, DDX_Buhannic 003.
Provisional U.S. Appl. No. 60/678,106, filed May 4, 2005, by Rosenthal et al.
Provisional U.S. Appl. No. 60/736,353, filed Nov. 13, 2005, by Mackey et al.
RCG Expert Declaration of W. Buist in Case 1:05-cv-04088, *Rosenthal Collins Group, LLC*, vs. *Trading Technologies International, Inc.*, Apr. 26, 2006, PDX 365.
RCG Expert Declaration of Walter D. Buist in Case 1:05-cv-04088, *Rosenthal Collins Group, LLC*, vs. *Trading Technologies International, Inc.*, Sep. 29, 2006, PDX 952.
Release Form for Sachs Communications Group, alleged available as of Sep. 15, 1998, DDX 204.
Release Form for Sachs Communications Group, alleged available as of Sep. 16, 1998, DDX 206.
Rosenthal Collins Group LLC, Initial Contentions for Non-Infringement and Patent Invalidity, Civil Action No. 10-cv-929, dated Oct. 29, 2010.
Sachs Communication Group Release Form, alleged available as of Sep. 14, 1998, SACHS000055, DDX 202.
Sachs Communications Group Invoice to Mauro Designs, alleged available as of Oct. 20, 1998, SACHS000050-000051 DDX 197.
Sachs Communications Groups Client Sign-In Checklist, alleged available as of Sep. 14, 1998, SACHS000054, DDX 201.
Sachs Communications Groups Client Sign-In Form, alleged available as of Sep. 14, 1998, SACHS000053, DDX 200.
Sachs Communications Groups Client Sign-In Form, alleged available as of Sep. 15, 1998, SACHS000015, DDX 203.
Sachs Communications Groups Client Sign-In Form, alleged available as of Sep. 16, 1998, SACHS000027, DDX 205.
Schroeder, M. "After-Hours Trading is Coming" Investor Relations Business, Mar. 15, 1999, DDX 550.
Schroeder, M. "Eclipse's After-Hours Trading Service Due to Debut This Summer" Web Finance, Mar. 15, 1999, DDX 550.
Schroeder, M. "Knight to Offer After-Hours Trading" Web Finance, Mar. 29, 1999, DDX 550.
Schwartz, R., and Weber, B., "Next-Generation Securities Market Systems: An Experimental Investigation of Quote-Driven and Order-Driven Trading" Journal of Management Information Systems, vol. 14, No. 2, p. 57-59, alleged available as of Fall 1997. CME-E0000786-0000808.
Screenshot of C:\ drive, alleged available as of Apr. 18, 2006, PDX 951.
Screenshot of filepath L:\java\com\witcapital\dsm\client, alleged available as of Nov. 3, 1998, PDX 953.
SPATS (Security Pacific Automated Trader System), The Electronic Broker, User Manual, alleged available as of Jun. 26, 1986, WF005924-WF005964.
Square, Final Fantasy II Instruction Booklet, alleged available as of Jan. 1, 1991, RCG-TT0146485-0146525.
Supplemental Invalidity and Unenforceability Contentions of GL, Civil Action No. 05-cv-4120, dated Mar. 8, 2013.
Swiss Exchange SWX, TS User Manual, Version 2.1, alleged available as of Dec. 31, 1998, G0107838-G0108086.
SWX, Annual Report, 1998, G0048218-0048270.
SWX, Bourse suisse Manuel d'utilisateur TS, v2.0 (French-language document), alleged available as of Aug. 31, 1996, G0079810-0080070, DDX_Buhannic 006.
SWX, Swiss Exchange SWX Presentation, IT Overview, alleged available as of Nov. 2, 1999, G0087803-0087818, DDX_Buhannic 0014.
SWX, The Swiss Exchange: From vision to reality, alleged available as of Dec. 1996, G0048801-0048838.
SWX, The SWX Platform and Associated Systems, alleged available as of May 1, 2006, G0029564-0029633, DDX_Buhannic 009.
TradeStation's Initial Invalidity Contentions, Civil Action No. 10-cv-884, dated Oct. 12, 2010.
*Trading Technologies International, Inc.*, v. *Ninja Trader, LLC*, Complaint for Patent Infringement and Jury Demand, Jul. 7, 2005, DDX 360.
TradingScreen, FuturesHUB Brochure, alleged available as of Nov. 1, 2007, DDX_Buhannic 013.
TSE Manual (Japanese-language document), System for Buying and Selling Futures and Options Transaction Terminal Operational Guidelines, alleged available as of Aug. 1, 1998, TSE0000000647.
Weber, B., "Assessing Alternative Market Structures Using Simulation Modeling," in Global Equity Markets: Technological, Competitive, and Regulatory Challenges, ed. Robert A. Schwartz (New York: New York University, 1995) p. 157-184, alleged available as of 1995, DONEFER003919-003935.
Weber, B., "Elements of Market Structure for On-Line Commerce" in Future Markets: How Information Technology Shapes Competition, C. Kemerer (ed.), Kluwer Academic Publishers, p. 15-32, alleged available as of 1998, CME-E0000809-CME-E0000826.
Weber, Bruce William. "Information Technology and Securities Markets: Feasibility and Desirability of Alternative Electronic Trading Systems," PhD dissertation, University of Pennsylvania. Ann Arbor: ProQuest/UMI, Order No. 9125774, alleged available as of 1991, G0171612-0171925.
Website of EccoWare, Professional Software for Professional Traders, [Retrieved from the Internet at http://www.eccoware.com/products.php on Jan. 23, 2007], alleged available as of Jan. 23, 2007, PDX_Feltes 002.
WIT Capital check, alleged available as of Oct. 19, 1998, DDX 199.
WIT Capital invoice, alleged available as of Sep. 30, 1998, DDX 198.

FIG. 2

| Contract | Depth | BidQty | BidPrc | AskPrc | AskQty | LastPrc | LastQty | Total |
|---|---|---|---|---|---|---|---|---|
| CDHO | • | 785 | 7626 | 7627 | 21 | 7627 | 489 | 8230 |
| | | 626 | 7625 | 7629 | 815 | | | |
| | | 500 | 7624 | 7630 | 600 | | | |
| | | 500 | 7623 | 7631 | 2456 | | | |
| | | 200 | 7622 | 7632 | 800 | | | |

| E/W | 10:48:44 | BidQ | AskQ | Prc | LTQ |
|---|---|---|---|---|---|
| | L 3 | | 104 | 99 | |
| | R 5 | | 24 | 98 | |
| | 720 | | 33 | 97 | |
| | × 10 | | 115 | 96 | |
| | 0 | | | | |
| | 10 1H | | 32 | 95 | |
| | 50 3H | | 27 | 94 | |
| S 0 W 24 | 1K 5H | | 63 | 93 | |
| S 0 W 7 | CLR | | 45 | 92 | |
| | × 10 | | 28 | 91 | |
| | 17 ▽ | | 20 | 90 | 10 |
| B 0 W 15 | CXL | 18 | | 89 | |
| B 0 W 13 | + − | 97 | | 88 | |
| | NET 0 | 30 | | 87 | |
| B 0 W 17 | NET REAL | 43 | | 86 | |
| | | 110 | | 85 | |
| | | 23 | | 84 | |
| | | 31 | | 83 | |
| | | 125 | | 82 | |
| | | 21 | | 81 | |

Title bar: SYCOM FGBL DEC99

Labels: 1001, 1002, 1003, 1004, 1005, 1006, 1007, 1008, 1009, 1010, 1011, 1012, 1013, 1014, 1015, 1016, 1017, 1018, 1019, 1020, 1021

FIG. 4

| E/W | 10:48:44 | | BidQ | AskQ | Prc | LTQ |
|---|---|---|---|---|---|---|
| | L | 3 | | 104 | 99 | |
| | R | 5 | | 24 | 98 | |
| | 720 | | | 33 | 97 | |
| | ✕ | 10 | | 115 | 96 | |
| | 0 | | | 32 | 95 | |
| | 10 | 1H | | 27 | 94 | |
| | 50 | 3H | | | | |
| S 10<br>W 14 | 1K | 5H | | 63 | 93 | 10 |
| | CLR | | 43 | | 92 | |
| | ✕ | 10 | 125 | | 91 | |
| | 17 ▼ | | 97 | | 90 | |
| B 0<br>W 15 | CXL | | 18 | | 89 | |
| B 0<br>W 13 | + | − | 97 | | 88 | |
| | NET 0 | | 30 | | 87 | |
| B 0<br>W 17 | NET REAL | | 43 | | 86 | |
| | | | 110 | | 85 | |
| | | | 23 | | 84 | |
| | | | 31 | | 83 | |
| | | | 125 | | 82 | |
| | | | 21 | | 81 | |

SYCOM FGBL DEC99

| E/W | 10:48:44 | BidQ | AskQ | Prc | LTQ |
|---|---|---|---|---|---|
| | L \| 3 | | 104 | 99 | |
| | R \| 5 | | 24 | 98 | |
| | 720 | | 33 | 97 | |
| | X \| 10 | | 115 | 96 | |
| | 0 | | 32 | 95 | |
| | 10 \| 1H | | | | |
| | 50 \| 3H | | 27 | 94 | |
| S 0 / W 24 | 1K \| 5H | | 63 | 93 | |
| S 0 / W 7 | CLR | | 45 | 92 | |
| | X \| 10 | | 28 | 91 | |
| | 17 ▾ | | 20 | 90 | 10 |
| B 0 / W 15 | CXL | 18 | | 89 | |
| B 0 / W 13 | + \| − | 97 | | 88 | |
| | NET 0 | 30 | | 87 | |
| B 0 / W 17 | NET REAL | 43 | | 86 | |
| | | 110 | | 85 | |
| | | 23 | | 84 | |
| | | 31 | | 83 | |
| | | 125 | | 82 | |
| | | 21 | | 81 | |

SYCOM FGBL DEC99

Labels: 1204, 1205, 1206, 1208 (left side); 1201, 1202, 1203, 1207 (bottom)

CLICK BASED TRADING WITH INTUITIVE GRID DISPLAY OF MARKET DEPTH

CROSS-REFERENCE TO RELATED APPLICATIONS

This application is a continuation of U.S. patent application Ser. No. 11/585,905, filed Oct. 25, 2006 and issued on Mar. 8, 2011 as U.S. Pat. No. 7,904,374, which is a continuation of U.S. patent application Ser. No. 11/415,163, filed May 2, 2006 and issued on Oct. 12, 2010, as U.S. Pat. No. 7,813,996, which is a continuation of U.S. patent application Ser. No. 10/237,131, filed Sep. 9, 2002 and now abandoned, which is a continuation of U.S. patent application Ser. No. 09/590,692, filed Jun. 9, 2000 and issued on Aug. 3, 2004 as U.S. Pat. No. 6,772,132, which claimed priority to U.S. Provisional Patent Application Ser. No. 60/186,322, filed Mar. 2, 2000 (and the contents of which are incorporated herein by reference).

FIELD OF INVENTION

The present invention is directed to the electronic trading of commodities. Specifically, the invention provides a trader with a versatile and efficient tool for executing trades. It facilitates the display of and the rapid placement of trade orders within the market trading depth of a commodity, where a commodity includes anything that can be traded with quantities and/or prices.

BACKGROUND OF THE INVENTION

At least 60 exchanges throughout the world utilize electronic trading in varying degrees to trade stocks, bonds, futures, options and other products. These electronic exchanges are based on three components: mainframe computers (host), communications servers, and the exchange participants' computers (client). The host forms the electronic heart of the fully computerized electronic trading system. The system's operations cover order-matching, maintaining order books and positions, price information, and managing and updating the database for the online trading day as well as nightly batch runs. The host is also equipped with external interfaces that maintain uninterrupted online contact to quote vendors and other price information systems.

Traders can link to the host through three types of structures: high speed data lines, high speed communications servers and the Internet. High speed data lines establish direct connections between the client and the host. Another connection can be established by configuring high speed networks or communications servers at strategic access points worldwide in locations where traders physically are located. Data is transmitted in both directions between traders and exchanges via dedicated high speed communication lines. Most exchange participants install two lines between the exchange and the client site or between the communication server and the client site as a safety measure against potential failures. An exchange's internal computer system is also often installed with backups as a redundant measure to secure system availability. The third connection utilizes the Internet. Here, the exchange and the traders communicate back and forth through high speed data lines, which are connected to the Internet. This allows traders to be located anywhere they can establish a connection to the Internet.

Irrespective of the way in which a connection is established, the exchange participants' computers allow traders to participate in the market. They use software that creates specialized interactive trading screens on the traders' desktops. The trading screens enable traders to enter and execute orders, obtain market quotes, and monitor positions. The range and quality of features available to traders on their screens varies according to the specific software application being run. The installation of open interfaces in the development of an exchange's electronic strategy means users can choose, depending on their trading style and internal requirements, the means by which they will access the exchange.

The world's stock, bond, futures and options exchanges have volatile products with prices that move rapidly. To profit in these markets, traders must be able to react quickly. A skilled trader with the quickest software, the fastest communications, and the most sophisticated analytics can significantly improve his own or his firm's bottom line. The slightest speed advantage can generate significant returns in a fast moving market. In today's securities markets, a trader lacking a technologically advanced interface is at a severe competitive disadvantage.

Irrespective of what interface a trader uses to enter orders in the market, each market supplies and requires the same information to and from every trader. The bids and asks in the market make up the market data and everyone logged on to trade can receive this information if the exchange provides it. Similarly, every exchange requires that certain information be included in each order. For example, traders must supply information like the name of the commodity, quantity, restrictions, price and multiple other variables. Without all of this information, the market will not accept the order. This input and output of information is the same for every trader.

With these variables being constant, a competitive speed advantage must come from other aspects of the trading cycle. When analyzing the time it takes to place a trade order for a given commodity, various steps contribute in different amounts to the total time required. Approximately 8% of the total time it takes to enter an order elapses between the moment the host generates the price for the commodity and the moment the client receives the price. The time it takes for the client application to display the price to the trader amounts to approximately 4%. The time it takes for a trade order to be transmitted to the host amounts to approximately 8%. The remainder of the total time it takes to place an order, approximately 80%, is attributable to the time required for the trader to read the prices displayed and to enter a trade order. The present invention provides a significant advantage during the slowest portion of the trading cycle—while the trader manually enters his order. Traders recognize that the value of time savings in this portion may amount to millions of dollars annually.

In existing systems, multiple elements of an order must be entered prior to an order being sent to market, which is time consuming for the trader. Such elements include the commodity symbol, the desired price, the quantity and whether a buy or a sell order is desired. The more time a trader takes entering an order, the more likely the price on which he wanted to bid or offer will change or not be available in the market. The market is fluid as many traders are sending orders to the market simultaneously. It fact, successful markets strive to have such a high volume of trading that any trader who wishes to enter an order will find a match and have the order filled quickly, if not immediately. In such liquid markets, the prices of the commodities fluctuate rapidly. On a trading screen, this results in rapid changes in the price and quantity fields within the market grid. If a trader intends to enter an order at a particular price, but misses the price because the market prices moved before he could enter the order, he may lose hundreds, thousands, even millions of dollars. The faster a trader can trade, the less likely it will be that he will miss his price and the more likely he will make money.

SUMMARY OF THE INVENTION

The inventors have developed the present invention which overcomes the drawbacks of the existing trading systems and dramatically reduces the time it takes for a trader to place a trade when electronically trading on an exchange. This, in turn, increases the likelihood that the trader will have orders filled at desirable prices and quantities.

The "Mercury" display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently.

Specifically, the present invention is directed to a graphical user interface for displaying the market depth of a commodity traded in a market, including a dynamic display for a plurality of bids and for a plurality of asks in the market for the commodity and a static display of prices corresponding to the plurality of bids and asks. In this embodiment the pluralities of bids and asks are dynamically displayed in alignment with the prices corresponding thereto. Also described herein is a method and system for placing trade orders using such displays.

These embodiments, and others described in greater detail herein, provide the trader with improved efficiency and versatility in placing, and thus executing, trade orders for commodities in an electronic exchange. Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

FIG. 2 illustrates screen display showing the inside market and the market depth of a given commodity being traded;

FIG. 3 illustrates the Mercury display of the present invention;

FIG. 4 illustrates the Mercury display at a later time showing the movement of values when compared to FIG. 3;

FIG. 5 illustrates a Mercury display with parameters set in order to exemplify the Mercury trading method.

DETAILED DESCRIPTION OF THE PREFERRED EMBODIMENTS

As described with reference to the accompanying figures, the present invention provides a display and trading method to ensure fast and accurate execution of trades by displaying market depth on a vertical or horizontal plane, which fluctuates logically up or down, left or right across the plane as the market prices fluctuates. This allows the trader to place trade orders quickly and efficiently. A commodity's market depth is the current bid and ask prices and quantities in the market. The display and trading method of the invention increase the likelihood that the trader will be able to execute orders at desirable prices and quantities.

In the preferred embodiment, the present invention is implemented on a computer or electronic terminal. The computer is able to communicate either directly or indirectly (using intermediate devices) with the exchange to receive and transmit market, commodity, and trading order information. It is able to interact with the trader and to generate contents and characteristics of a trade order to be sent to the exchange. It is envisioned that the system of the present invention can be implemented on any existing or future terminal or device with the processing capability to perform the functions described herein. The scope of the present invention is not limited by the type of terminal or device used. Further, the specification refers to a single click of a mouse as a means for user input and interaction with the terminal display as an example of a single action of the user. While this describes a preferred mode of interaction, the scope of the present invention is not limited to the use of a mouse as the input device or to the click of a mouse button as the user's single action. Rather, any action by a user within a short period of time, whether comprising one or more clicks of a mouse button or other input device, is considered a single action of the user for the purposes of the present invention.

Figure 1:
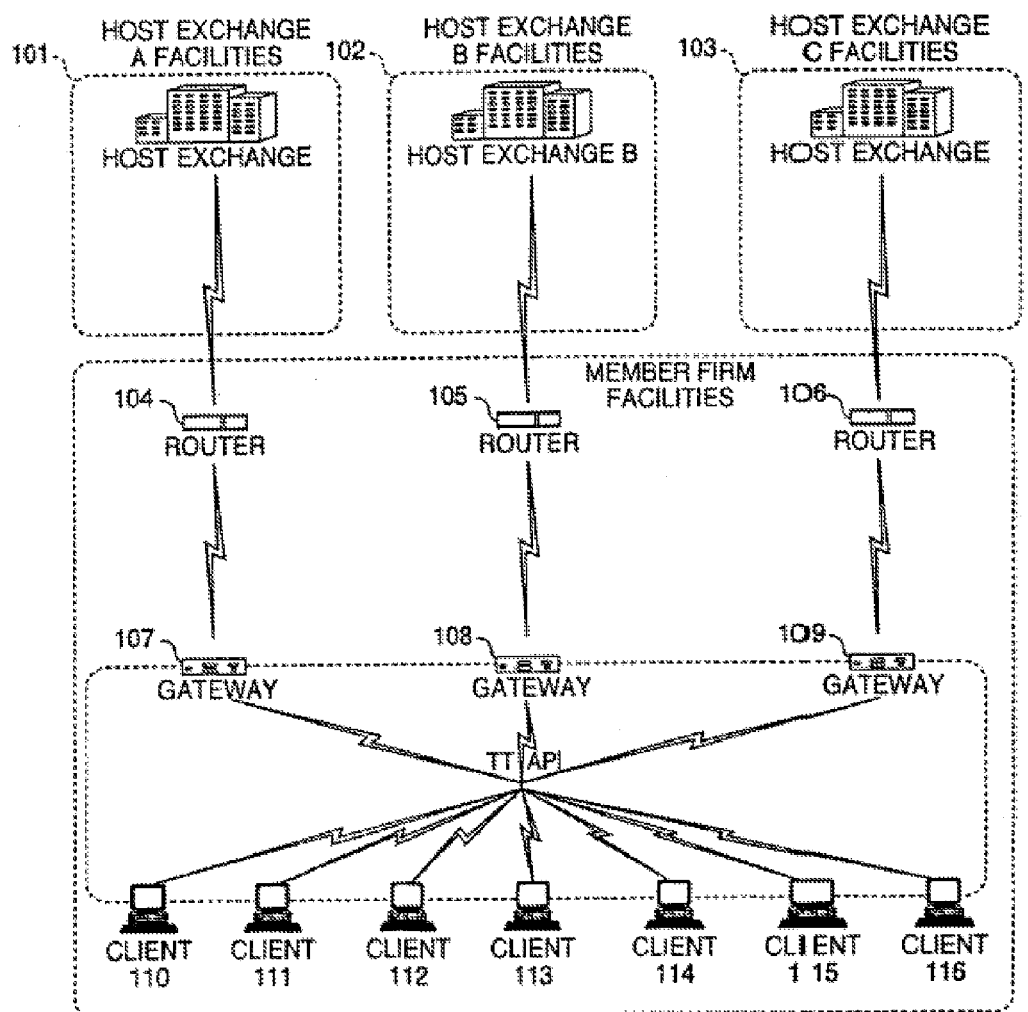
FIG. 1 illustrates the network connections between multiple exchanges and client sites.

The system can be configured to allow for trading in a single or in multiple exchanges simultaneously. Connection of the system of the present invention with multiple exchanges is illustrated in FIG. 1. This figure shows multiple host exchanges 101-103 connected through routers 104-106 to gateways 107-109. Multiple client terminals 110-116 for use as trading stations can then trade in the multiple exchanges through their connection to the gateways 107-109. When the system is configured to receive data from multiple exchanges, then the preferred implementation is to translate the data from various exchanges into a simple format. This "translation" function is described below with reference to FIG. 1. An applications program interface ("TT API" as depicted in the figure) translates the incoming data formats from the different exchanges to a simple preferred data format. This translation function may be disposed anywhere in the network, for example, at the gateway server, at the individual workstations or at both. In addition, the storage at gateway servers and at the client workstations, and/or other external storage cache historical data such as order books which list the client's active orders in the market; that is, those orders that have neither been filled nor cancelled. Information from different exchanges can be displayed at one or in multiple windows at the client workstation. Accordingly, while reference is made through the remainder of the specification to a single exchange to which a trading terminal is connected, the scope of the invention includes the ability to trade, in accordance with the trading methods described herein, in multiple exchanges using a single trading terminal.

The preferred embodiments of the present invention include the display of "Market Depth" and allow traders to view the market depth of a commodity and to execute trades within the market depth with a single click of a computer mouse button. Market Depth represents the order book with the current bid and ask prices and quantities in the market. In other words, Market Depth is each bid and ask that was entered into the market, subject to the limits noted below, in addition to the inside market. For a commodity being traded, the "inside market" is the highest bid price and the lowest ask price.

The exchange sends the price, order and fill information to each trader on the exchange. The present invention processes this information and maps it through simple algorithms and mapping tables to positions in a theoretical grid program or any other comparable mapping technique for mapping data to a screen. The physical mapping of such information to a screen grid can be done by any technique known to those skilled in the art. The present invention is not limited by the method used to map the data to the screen display.

How far into the market depth the present invention can display depends on how much of the market depth the exchange provides. Some exchanges supply an infinite market depth, while others provide no market depth or only a few orders away from the inside market. The user of the present invention can also chose how far into the market depth to display on his screen.

FIG. 2 illustrates a screen display of an invention described in a commonly owned co-pending application entitled "Click Based Trading with Market Depth Display" and having U.S. patent application Ser. No. 09/589,751, which was filed on Jun. 9, 2000 and which issued on Aug. 30, 2005 as U.S. Pat. No. 6,938,011, and the contents of which are incorporated herein by reference. This display shows the inside market and the market depth of a given commodity being traded. Row 1 represents the "inside market" for the commodity being traded which is the best (highest) bid price and quantity and the best (lowest) ask price and quantity. Rows 2-5 represent the "market depth" for the commodity being traded. In the preferred embodiment of the present invention, the display of market depth (rows 2-5) lists the available next-best bids, in column 203, and asks, in column 204. The working bid and ask quantity for each price level is also displayed in columns 202 and 205 respectively (inside market-row 1). Prices and quantities for the inside market and market depth update dynamically on a real time basis as such information is relayed from the market.

In the screen display shown in FIG. 2, the commodity (contract) being traded is represented in row 1 by the character string "CDH0". The Depth column 208 will inform the trader of a status by displaying different colors. Yellow indicates that the program application is waiting for data. Red indicates that the Market Depth has failed to receive the data from the server and has "timed out." Green indicates that the data has just been updated. The other column headings in this and all of the other figures are defined as follows. BidQty (Bid Quantity): the quantity for each working bid, BidPrc (Bid Price): the price for each working bid, AskPrc (Ask Price): the price for each working ask, AskQty (Ask Quantity): the quantity for each working ask, LastPrc (Last Price): the price for the last bid and ask that were matched in the market and LastQty (Last Quantity): the quantity traded at the last price. Total represents the total quantity traded of the given commodity.

The configuration of the screen display itself informs the user in a more convenient and efficient manner than existing systems. Traders gain a significant advantage by seeing the market depth because they can see trends in the orders in the market. The market depth display shows the trader the interest the market has in a given commodity at different price levels. If a large amount of bids or asks are in the market near the trader's position, he may feel he should sell or buy before the inside market reaches the morass of orders. A lack of orders above or below the inside market might prompt a trader to enter orders near the inside market. Without seeing the market depth, no such strategies could be utilized. Having the dynamic market depth, including the bid and ask quantities and prices of a traded commodity aligned with and displayed below the current inside market of the commodity conveys the information to the user in a more intuitive and easily understandable manner. Trends in the trading of the commodity and other relevant characteristics are more easily identifiable by the user through the use of the present invention.

Various abbreviations are used in the screen displays, and specifically, in the column headings of the screen displays reproduced herein. Some abbreviations have been discussed above. A list of common abbreviations and their meanings is provided in Table 1.

TABLE I

Abbreviations

| COLUMN | DESCRIPTION | COLUMN | DESCRIPTION |
| --- | --- | --- | --- |
| Month | Expiration Month/Year | TheoBid | Theoretical Bid Price |
| Bid Mbr(1) | Bid Member ID | TheoAsk | Theoretical Ask Price |
| WrkBuys(2) | Working Buys for entire Group ID | QAct | Quote Action (Sends individual quotes) |
| BidQty | Bid Quantity | BQQ | Test Bid Quote Quantity |
| ThrshBid(6) | Threshold Bid Price | BQP | Test Bid Quote Price |
| BidPrc | Bid Price | Mkt BQQ | Market Bid Quote Quantity |
| Bid Qty Accum | Accumulated Bid Quantity | Mkt BQP | Market Bid Quote Price |
| BidPrc Avg | Bid Price Average | Quote | Checkbox activates/deactivates contract for quoting |
| AskPrc Avg | Ask Price Average | Mkt AQQ | Market Ask Quote Quantity |
| AskQty Accum | Accumulated Ask Quantity | Mkt AQP | Market Ask Quote Price |
| AskPrc | Ask Price | AQP | Ask Quote Price |
| ThrshAsk(6) | Threshold Ask Price | AQQ | Ask Quote Quantity |
| AskQty | Ask Quantity | Imp BidQty(5) | Implied Bid Quantity |
| WrkSells(2) | Working Sells for entire Group ID | Imp BidPrc(5) | Implied Bid Price |
| Ask Mbr(1) | Ask Member ID | Imp AskQty(5) | Implied Ask Quantity |
| NetPos | Net Position | Imp AskPrc(5) | Implied Ask Price |
| FFNetPos | Fast Fill Net Position | Gamma(3) | Change in Delta given 1 pt change in underlying |
| LastPrc | Last Price | Delta(3) | Change in price given 1 pt change in underlying |
| LastQty | Last Quantity | Vola(3) | Percent volatility |
| Total | Total Traded Quantity | Vega(3) | Price change given 1% change in Vola |
| High | High Price | Rho(3) | Price change given 1% change in interest rate |

TABLE I-continued

Abbreviations

| COLUMN | DESCRIPTION | COLUMN | DESCRIPTION |
| --- | --- | --- | --- |
| Low | Low Price | Theta(3) | Price change for every day that elapses |
| Open | Opening Price | Click Trd | Activate/deactivate click trading by contract |
| Close | Closing Price | S (Status) | Auction, Closed, FastMkt, Not Tradable, Pre-trading, Tradable, S = post-trading |
| Chng | Last Price-Last Close | Expiry | Expiration Month/Year |
| TheoPrc | Theoretical Price | | |

As described herein, the display and trading method of the present invention provide the user with certain advantages over systems in which a display of market depth, as shown in FIG. 2, is used. The Mercury display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently. An example of such a Mercury display is illustrated in the screen display of FIG. 3.

The display of market depth and the manner in which traders trade within the market depth can be effected in different manners, which many traders will find materially better, faster and more accurate. In addition, some traders may find the display of market depth to be difficult to follow. In the display shown in FIG. 2, the market depth is displayed vertically so that both Bid and Ask prices descend the grid. The Bid prices descend the market grid as the prices decrease. Ask prices also descend the market grid as these prices actually increase. This combination may be considered counterintuitive and difficult to follow by some traders.

The Mercury display overcomes this problem in an innovative and logical manner. Mercury also provides an order entry system, market grid, fill window and summary of market orders in one simple window. Such a condensed display materially simplifies the trading system by entering and tracking trades in an extremely efficient manner. Mercury displays market depth in a logical, vertical fashion or horizontally or at some other convenient angle or configuration. A vertical field is shown in the figures and described for convenience, but the field could be horizontal or at an angle. In turn, Mercury further increases the speed of trading and the likelihood of entering orders at desired prices with desired quantities. In the preferred embodiment of the invention, the Mercury display is a static vertical column of prices with the bid and ask quantities displayed in vertical columns to the side of the price column and aligned with the corresponding bid and ask prices. An example of this display is shown in FIG. 3.

Bid quantities are in the column 1003 labeled BidQ and ask quantities are in column 1004 labeled AskQ. The representative ticks from prices for the given commodity are shown in column 1005. The column does not list the whole prices (e.g. 95.89), but rather, just the last two digits (e.g. 89). In the example shown, the inside market, cells 1020, is 18 (best bid quantity) at 89 (best bid price) and 20 (best ask quantity) at 90 (best ask price). In the preferred embodiment of the invention, these three columns are shown in different colors so that the trader can quickly distinguish between them.

The values in the price column are static; that is, they do not normally change positions unless a re-centering command is received (discussed in detail later). The values in the Bid and Ask columns however, are dynamic; that is, they move up and down (in the vertical example) to reflect the market depth for the given commodity. The LTQ column 1006 shows the last traded quantity of the commodity. The relative position of the quantity value with respect to the Price values reflects the price at which that quantity was traded. Column 1001 labeled E/W (entered/working) displays the current status of the trader's orders. The status of each order is displayed in the price row where it was entered. For example, in cells 1007, the number next to S indicates the number of the trader's ordered lots that have been sold at the price in the specific row. The number next to W indicates the number of the trader's ordered lots that are in the market, but have not been filled—i.e. the system is working on filling the order. Blanks in this column indicate that orders are entered or working at that price. In cells 1008, the number next to B indicates the number of the trader's ordered lots that have been bought at the price in the specific row. The number next to W indicates the number of the trader's ordered lots that are in the market, but have not been filled—i.e. the system is working on filling the order.

Various parameters are set and information is provided in column 1002. For example, "10:48:44" in cell 1009 shows the actual time of day. The L and R fields in cell 1010 indicate a quantity value, which may be added to the order quantity entered. This process is explained below with respect to trading under Mercury. Below the L and R fields, in cell 1011, a number appears which represents the current market volume. This is the number of lots that have been traded for the chosen contract. Cell 1012, "X 10", displays the Net Quantity, the current position of the trader on the chosen contract. The number "10" represents the trader's buys minus sells. Cell 1013 is the "Current Quantity"; this field represents the quantity for the next order that the trader will send to market. This can be adjusted with right and left clicks (up and down) or by clicking the buttons which appear below the Current Quantity in cells 1014. These buttons increase the current quantity by the indicated amount; for example, "10" will increase it by 10; "1H" will increase it by 100; "1K" will increase it by 1000. Cell 1015 is the Clear button; clicking this button will clear the Current Quantity field. Cell 1016 is the Quantity Description; this is a pull down menu allowing the trader to chose from three Quantity Descriptions. The pull down menu is displayed when the arrow button in the window is clicked. The window includes NetPos, Offset and a field allowing the trader to enter numbers. Placing a number in this field will set a default buy or sell quantity. Choosing "Offset" in this field will enable the L/R buttons of cell 1010. Choosing "NetPos" in this field will set the current Net Quantity (trader's net position) as the trader's quantity for his next trade. Cell 1017 are +/−buttons; these buttons will alter the size of the screen—either larger (+) or smaller (−). Cell 1018 is used to invoke Net 0; clicking this button will reset the Net Quantity (cell 1011)

to zero. Cell 1019 is used to invoke Net Real; clicking this button will reset the Net Quantity (cell 1011) to its actual position.

The inside market and market depth ascend and descend as prices in the market increase and decrease. For example, FIG. 4 shows a screen displaying the same market as that of FIG. 3 but at a later interval where the inside market, cells 1101, has risen three ticks. Here, the inside market for the commodity is 43 (best bid quantity) at 92 (best bid price) and 63 (best ask quantity) at 93 (best ask price). In comparing FIGS. 3 and 4, it can be seen that the price column remained static, but the corresponding bids and asks rose up the price column. Market Depth similarly ascends and descends the price column, leaving a vertical history of the market.

As the market ascends or descends the price column, the inside market might go above or below the price column displayed on a trader's screen. Usually a trader will want to be able to see the inside market to assess future trades. The system of the present invention addresses this problem with a one click centering feature. With a single click at any point within the gray area, 1021, below the "Net Real" button, the system will re-center the inside market on the trader's screen. Also, when using a three-button mouse, a click of the middle mouse button, irrespective of the location of the mouse pointer, will re-center the inside market on the trader's screen.

The same information and features can be displayed and enabled in a horizontal fashion. Just as the market ascends and descends the vertical Mercury display shown in FIGS. 3 and 4, the market will move left and right in the horizontal Mercury display. The same data and the same information gleaned from the dynamical display of the data is provided. It is envisioned that other orientations can be used to dynamically display the data and such orientations are intended to come within the scope of the present invention.

Next, trading commodities, and specifically, the placement of trade orders using the Mercury display is described. Using the Mercury display and trading method, a trader would first designate the desired commodity and, if applicable, the default quantities. Then he can trade with single clicks of the right or left mouse button. The following equations are used by the system to generate trade orders and to determine the quantity and price to be associated with the trade order. The following abbreviations are used in these formulas: P=Price value of row clicked, R=Value in R field, L=Value in L field, Q=Current Quantity, $Q_a$=Total of all quantities in AskQ column at an equal or better price than P, $Q_b$=Total of all quantities in BidQ column at an equal or better price than P, N=Current Net Position, Bo=Buy order sent to market and So=Sell order sent to market.

Any Order Entered Using Right Mouse Button $Bo=(Q_a+R)P$ (Eq. 1) If BidQ field clicked.

$So=(Q_b+R)P$ (Eq. 2) If AskQ field clicked.

Orders Entered Using the Left Mouse Button

If "Offset" mode chosen in Quantity Description field then:

$Bo=(Qa+L)P$ (Eq. 3) If BidQ field clicked.

$So=(Q_b+L)P$ (Eq. 4) If AskQ field clicked.

If "number" mode chosen in Quantity Description field then:

$Bo=QP$ (Eq. 5)

$So=QP$ (Eq. 6)

If "NetPos" mode chosen in Quantity Description field then:

$Bo=NP$ (Eq. 7)

$So=NP$ (Eq. 8)

Orders can also be sent to market for quantities that vary according to the quantities available in the market; quantities preset by the trader; and which mouse button the trader clicks. Using this feature, a trader can buy or sell all of the bids or asks in the market at or better than a chosen price with one click. The trader could also add or subtract a preset quantity from the quantities outstanding in the market. If the trader clicks in a trading cell—i.e. in the BidQ or AskQ column, he will enter an order in the market. The parameters of the order depend on which mouse button he clicks and what preset values he set.

Using the screen display and values from FIG. 5, the placement of trade orders using the Mercury display and trading method is now described using examples. A left click on the 18 in the BidQ column 1201 will send an order to market to sell 17 lots (quantity # chosen on the Quantity Description pull down menu cell 1204) of the commodity at a price of 89 (the corresponding price in the Prc column 1203). Similarly, a left click on the 20 in the AskQ column 1202 will send an order to market to buy 17 lots at a price of 90.

Using the right mouse button, an order would be sent to market at the price that corresponds to the row clicked for the total quantity of orders in the market that equal or better the price in that row plus the quantity in the R field 1205. Thus, a right click in the AskQ column 1202 in the 87 price row will send a sell order to market at a price of 87 and a quantity of 150. 150 is the sum of all the quantities 30, 97, 18 and 5, 30, 97 and 18 are all of the quantities in the market that would meet or better the trader's sell order price of 87. These quantities are displayed in the BidQ column 1201 because this column represents the orders outstanding in the market to purchase the commodity at each corresponding price. The quantity 5 is the quantity pre-set in the R field 1205.

Similarly, a right click in the BidQ column 1201 at the same price level of 87 would send a buy limit order to market for a quantity of 5 at a price of 87. The quantity is determined in the same manner as above. In this example, though, there are no orders in the market that equal or better the chosen price—there are no quantities in the AskQ column 1202 that equal or better this price. Therefore, the sum of the equal or better quantities is zero ("0"). The total order entered by the trader will be the value in the R field, which is 5.

An order entered with the left mouse button and the "Offset" option chosen in the quantity description field 1204 will be calculated in the same way as above, but the quantity in the L field 1206 will be added instead of the quantity in the R field 1205. Thus, a left click in the BidQ column 1201 in the 92 price row will send a buy order to market at a price of 92 and a quantity of 96. 96 is the sum of all the quantities 45, 28, 20 and 3, 45, 28 and 20 are all quantities in the market that would meet or better the trader's buy order price of 92. These quantities are displayed in the AskQ column 1202 because this column represents the orders outstanding in the market to sell the commodity at each corresponding price. The quantity 3 is the quantity pre-set in the L field 1206.

The values in the L or R fields may be negative numbers. This would effectively decrease the total quantity sent to market. In other words, in the example of a right click in the AskQ column 1202 in the 87 price row, if the R field was −5, the total quantity sent to market would be 140 (30+97+18+(−5)).

If a trader chose the "NetPos" option in the quantity description field 1204, a right click would still work as explained above. A left click would enter an order with a price corresponding to the price row clicked and a quantity equal to the current Net position of the trader. The Net position of the trader is the trader's current position on the chosen contract. In other words, if the trader has bought 10 more contracts than he has sold, this value would be 10. NetPos would not affect the quantity of an order sent with a right click.

If the trader chose a number value in the quantity description, a left click would send an order to market for the current quantity chosen by the trader. The default value of the current quantity will be the number entered in the quantity description field, but it could be changed by adjusting the figure in the current quantity field 1204.

This embodiment of the invention also allows a trader to delete all of his working trades with a single click of either the right or left mouse button anywhere in the last traded quantity (LTQ) column 1207. This allows a trader to exit the market immediately. Traders will use this feature when they are losing money and want to stop the losses from pilling up. Traders may also use this feature to quickly exit the market upon making a desired profit. The invention also allows a trader to delete all of his orders from the market at a particular price level. A click with either mouse button in the Entered/Working (E/W) column 1208 will delete all working orders in the cell that was clicked. Thus, if a trader believes that previously sent orders at a particular price that have not been filled would be poor trades, he can delete these orders with a single click.

Figure 6:
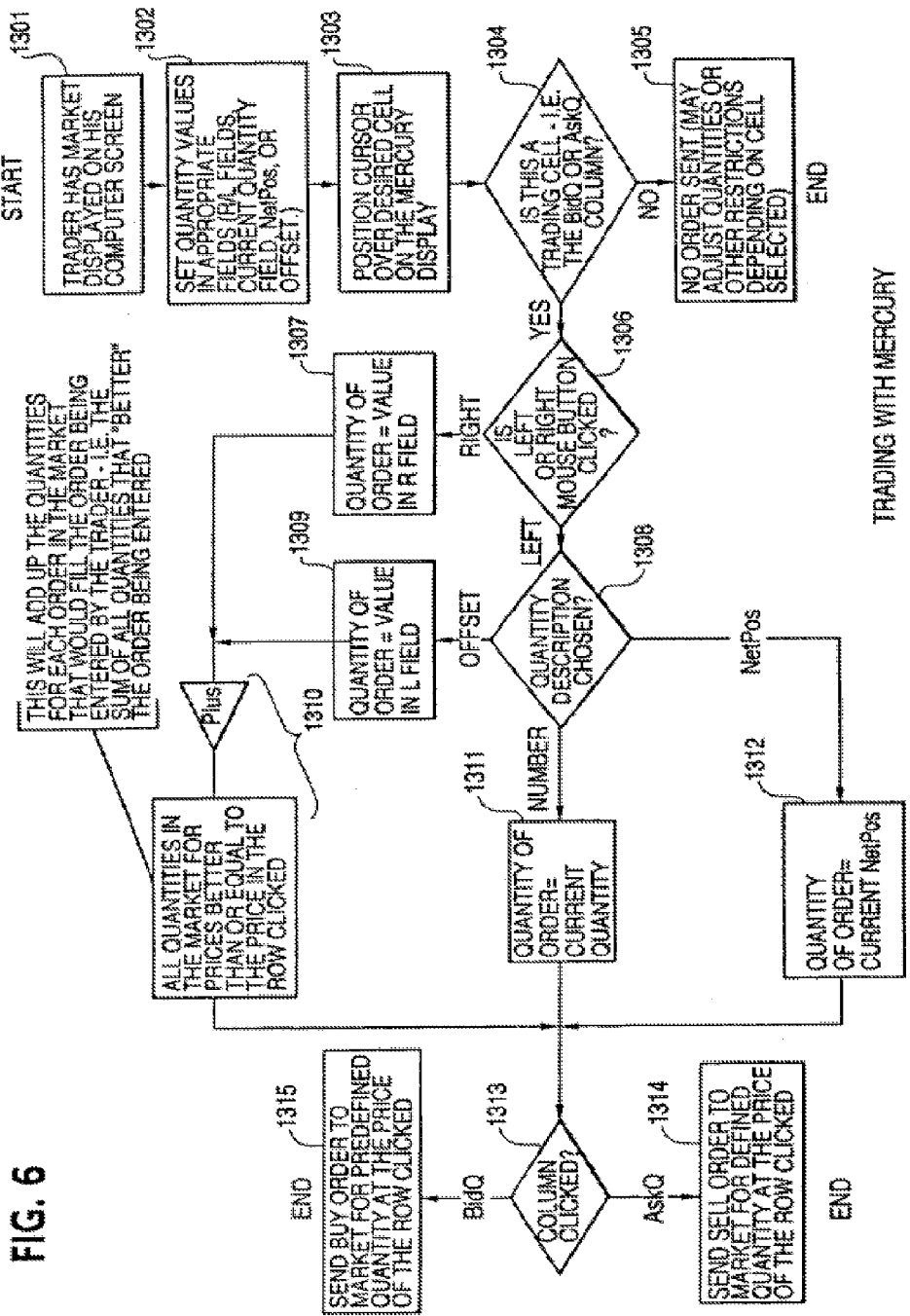
FIG. 6 is a flowchart illustrating the process for Mercury display and trading.

The process for placing trade orders using the Mercury display and trading method of the present invention as described above is shown in the flowchart of FIG. 6. First, in step 1301, the trader has the Mercury display on the trading terminal screen showing the market for a given commodity. In step 1302, the parameters are set in the appropriate fields, such as the L and R fields and the Current Quantity, NetPos or Offset fields from the pull down menu. In step 1303, the mouse pointer is positioned and clicked over a cell in the Mercury display by the trader. In step 1304, the system determines whether the cell clicked is a tradable cell (i.e. in the AskQ column or BidQ column). If not, then in step 1305, no trade order is created or sent and, rather, other quantities are adjusted or functions are performed based upon the cell selected. Otherwise, in step 1306, the system determines whether it was the left or the right button of the mouse that was clicked. If it was the right, then in step 1307, the system will use the quantity in the R field when it determines the total quantity of the order in step 1310. If the left button was clicked, then in step 1308, the system determines which quantity description was chosen: Offset, NetPos or an actual number.

If Offset was chosen, then the system, in step 1309, will use the quantity in the L field when it determines the total quantity of the order in step 1310. If NetPos was chosen, then the system, in step 1312, will determine that the total quantity for the trade order will be current NetPos value, i.e. the net position of the trader in the given commodity. If an actual number was used as the quantity description, then, in step 1311, the system will determine that the total quantity for the trade order will be the current quantity entered. In step 1310, the system will determine that the total quantity for the trade order will be the value of the R field (if step 1307 was taken) or the value of the L field (if step 1309 was taken) plus all quantities in the market for prices better than or equal to the price in the row clicked. This will add up the quantities for each order in the market that will fill the order being entered by the trader (plus the L or R value).

After either steps 1310, 1311 or 1312, the system, in step 1313, determines which column was clicked, BidQ or AskQ. If AskQ was clicked, then, in step 1314, the system sends a sell limit order to the market at the price corresponding to the row for the total quantity as already determined. If BidQ was clicked, then, in step 1315, the system sends a buy limit order to the market at the price corresponding to the row for the total quantity as already determined.

It should be understood that the above description of the invention and specific examples, while indicating preferred embodiments of the present invention, are given by way of illustration and not limitation. Many changes and modifications within the scope of the present invention may be made without departing from the spirit thereof, and the present invention includes all such changes and modifications.

The invention claimed is:

1. A method for repositioning market data related to a commodity on a graphical user interface, the method comprising:
    receiving, by a computing device, an inside market with a highest bid price and a lowest ask price for a commodity based on market information received from an electronic exchange;
    dynamically displaying, by the computing device, a first indicator in one of a plurality of locations in a window, each location of the plurality of locations corresponding to a price level along a price axis, the first indicator corresponding to the highest bid price, wherein the first indicator is moved to a different location of the first plurality of locations relative to the price axis in response to determining a new highest bid price for the commodity based on new market information from the electronic exchange;
    dynamically displaying, by the computing device, a second indicator in one of the plurality of locations in the window, the second indicator corresponding to the lowest ask price, wherein the second indicator is moved to a different location of the plurality of locations relative to the price axis in response to determining a new lowest ask price for the commodity based on new market information from the electronic exchange;
    receiving, by the computing device, new market information from the electronic exchange, wherein the new market information includes at least one of a new highest bid price and a new lowest ask price, such that when the first indicator and the second indicator are updated based on the new market information, the inside market is not substantially centered in the window;
    receiving, by the computing device, a manual repositioning command from a user input device; and responsively,
    repositioning, by the computing device, the price axis such that the inside market is displayed substantially at the center of the window.

2. The method of claim 1, further comprising:
    displaying the first and second indicators substantially at the center of the window responsive to the manual repositioning command.

3. The method of claim 1, further comprising:
    displaying the first indicator in a bid display region comprising a first plurality of locations, each location of the first plurality of locations corresponding to a price level along the price axis; and
    displaying the second indicator in an ask display region comprising a second plurality of locations, each location of the second plurality of locations corresponding to a price level along the price axis.

4. The method of claim 1, wherein the first indicator represents a quantity associated with at least one order to buy the commodity at the highest bid price, and wherein the second indicator represents a quantity associated with at least one order to sell the commodity at the lowest ask price.

5. The method of claim 1, wherein the plurality of locations are displayed in a grid.

6. The method of claim 1, wherein the manual repositioning command comprises a single action of the user input device.

7. The method of claim 6, wherein the single action consists of a single click of the user input device.

8. The method of claim 1, further comprising:
displaying an order entry region comprising a plurality of locations for receiving commands to send trade orders, each location in the order entry region corresponding to a price level along the price axis; and
selecting a plurality of trade order parameters for a trade order and sending the trade order to the electronic exchange in response to receiving commands based on user actions consisting of: (1) placing a cursor associated with the user input device over a particular location of the order entry region and (2) selecting the particular location through a single action of the user input device.

9. The method of claim 8, wherein the single action of the user input device consists of a single click of the user input device.

10. The method of claim 8, wherein selecting the plurality of trade order parameters comprises selecting a price corresponding to the particular location.

11. The method of claim 8, wherein selecting the plurality of trade order parameters comprises selecting whether the trade order is a buy or a sell.

12. The method of claim 8, wherein the order entry region comprises:
a bid order entry region comprising a plurality of locations for receiving commands to send buy trade orders, each location in the bid order entry region corresponding to a price level along the price axis; and
an ask order entry region comprising a plurality of locations for receiving commands to send sell trade orders, each location in the ask order entry region corresponding to a price level along the price axis.

13. The method of claim 1, further comprising:
displaying a working order indicator in one of the plurality of locations in the window, wherein the working order indicator represents a trade order to buy or sell the commodity pending at the electronic exchange at a price corresponding to the one of the plurality of locations associated with the working order indicator.

14. The method of claim 13, further comprising:
receiving a command to delete the trade order pending at the electronic exchange responsive to selecting the working order indicator through a single action of the user input device with a pointer of the user input device positioned over the working order indicator.

15. The method of claim 14, wherein the single action that selects the working order indicator consists of a single click of the user input device.

16. The method of claim 1, further comprising:
displaying price levels along the price axis.

17. A computer readable medium having stored therein instructions executable by a processor, wherein the instructions are executable to:
receive an inside market with a highest bid price and a lowest ask price for a commodity based on market information received from an electronic exchange;
dynamically display a first indicator in one of a plurality of locations in a window, each location of the plurality of locations corresponding to a price level along a price axis, the first indicator corresponding to the highest bid price, wherein the first indicator is moved to a different location of the first plurality of locations relative to the price axis in response to determining a new highest bid price for the commodity based on new market information from the electronic exchange;
dynamically display a second indicator in one of the plurality of locations in the window, the second indicator corresponding to the lowest ask price, wherein the second indicator is moved to a different location of the plurality of locations relative to the price axis in response to determining a new lowest ask price for the commodity based on new market information from the electronic exchange;
receive new market information from the electronic exchange, wherein the new market information includes at least one of a new highest bid price and a new lowest ask price, such that when the first indicator and the second indicator are updated based on the new market information, the inside market is not substantially centered in the window;
receive a manual repositioning command from a user input device; and responsively,
reposition the price axis such that the inside market is displayed substantially at the center of the window.

18. The computer readable medium of claim 17, wherein the instructions are further executable to:
display the first and second indicators substantially at the center of the window responsive to the manual repositioning command.

19. The computer readable medium of claim 17, wherein the instructions are further executable to:
display the first indicator in a bid display region comprising a first plurality of locations, each location of the first plurality of locations corresponding to a price level along the price axis; and
display the second indicator in an ask display region comprising a second plurality of locations, each location of the second plurality of locations corresponding to a price level along the price axis.

20. The computer readable medium of claim 17, wherein the first indicator represents a quantity associated with at least one order to buy the commodity at the highest bid price, and wherein the second indicator represents a quantity associated with at least one order to sell the commodity at the lowest ask price.

21. The computer readable medium of claim 17, wherein the plurality of locations are displayed in a grid.

22. The computer readable medium of claim 17, wherein the manual repositioning command comprises a single action of the user input device.

23. The computer readable medium of claim 22, wherein the single action consists of a single click of the user input device.

24. The computer readable medium of claim 17, wherein the instructions are further executable to:
display an order entry region comprising a plurality of locations for receiving commands to send trade orders, each location in the order entry region corresponding to a price level along the price axis; and
select a plurality of trade order parameters for a trade order and send the trade order to the electronic exchange in response to receiving commands based on user actions consisting of: (1) placing a cursor associated with the user input device over a particular location of the order entry region and (2) selecting the particular location through a single action of the user input device.

25. The computer readable medium of claim 24, wherein the single action of the user input device consists of a single click of the user input device.

26. The computer readable medium of claim 25, wherein selecting the plurality of trade order parameters comprises selecting a price corresponding to the particular location.

27. The computer readable medium of claim 24, wherein selecting the plurality of trade order parameters comprises selecting whether the trade order is a buy or a sell.

28. The computer readable medium of claim 24, wherein the order entry region comprises:
- a bid order entry region comprising a plurality of locations for receiving commands to send buy trade orders, each location in the bid order entry region corresponding to a price level along the price axis; and
- an ask order entry region comprising a plurality of locations for receiving commands to send sell trade orders, each location in the ask order entry region corresponding to a price level along the price axis.

29. The computer readable medium of claim 17, wherein the instructions are further executable to:
display a working order indicator in one of the plurality of locations in the window, wherein the working order indicator represents a trade order to buy or sell the commodity pending at the electronic exchange at a price corresponding to the one of the plurality of locations associated with the working order indicator.

30. The computer readable medium of claim 29, wherein the instructions are further executable to:
receive a command to delete the trade order pending at the electronic exchange responsive to selecting the working order indicator through a single action of the user input device with a pointer of the user input device positioned over the working order indicator.

31. The computer readable medium of claim 30, wherein the single action that selects the working order indicator consists of a single click of the user input device.

32. The computer readable medium of claim 17, wherein the instructions are further executable to:
display price levels along the price axis.

* * * * *